(12) United States Patent
Osadchyy

(10) Patent No.: US 10,658,666 B2
(45) Date of Patent: *May 19, 2020

(54) COLORANT CHANGE PREDICTION

(71) Applicant: KYOCERA Document Solutions Inc., Osaka (JP)

(72) Inventor: Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,172

(22) Filed: Aug. 23, 2018

(65) Prior Publication Data

US 2019/0020029 A1    Jan. 17, 2019

Related U.S. Application Data

(63) Continuation of application No. 15/785,132, filed on Oct. 16, 2017, now Pat. No. 10,079,944, which is a
(Continued)

(51) Int. Cl.
*G06F 15/00*    (2006.01)
*G06F 3/12*    (2006.01)
(Continued)

(52) U.S. Cl.
CPC .......... *H01M 4/587* (2013.01); *C01B 32/05* (2017.08); *H01M 4/366* (2013.01); *H01M 4/625* (2013.01);
(Continued)

(58) Field of Classification Search
CPC .......... H04N 1/00023; H04N 1/00039; H04N 1/00055; H04N 1/00061; H04N 1/00068;
(Continued)

(56) References Cited

U.S. PATENT DOCUMENTS 5,802,420 A    9/1998    Garr et al.
6,856,430 B1    2/2005    Gase
(Continued)

OTHER PUBLICATIONS

K. Brown, "Multiple Linear Regression and Fourier Series", 1994.
(Continued)

*Primary Examiner* — Douglas Q Tran
(74) *Attorney, Agent, or Firm* — McDonnell Boehnen Hulbert & Berghoff LLP

(57) ABSTRACT

Methods and apparatus for predicting colorant usage by printing devices are provided. A prediction server can receive a request to predict colorant usage for a first printing device. The prediction server can determine first plurality of functions to predict colorant usage for the first printing device. The first plurality of functions can include at least one linear function and at least one non-linear function. The first plurality of functions can be based on colorant-usage rates indicating historical rates of change in colorant used by the first printing device. The prediction server can determine a prediction of colorant usage for the first printing device using the first plurality of functions. The prediction server can provide an output involving the prediction of colorant usage for the first printing device, where the prediction of colorant usage can include a confidence interval related to the prediction.

20 Claims, 22 Drawing Sheets

Related U.S. Application Data continuation of application No. 15/081,796, filed on Mar. 25, 2016, now Pat. No. 9,807,253.

(51) Int. Cl.

| | |
|---|---|
| *G06K 1/00* | (2006.01) |
| *H01M 4/587* | (2010.01) |
| *H04N 1/00* | (2006.01) |
| *H04N 1/60* | (2006.01) |
| *C01B 32/05* | (2017.01) |
| *H01M 4/36* | (2006.01) |
| *H01M 4/62* | (2006.01) |
| *H01M 10/0525* | (2010.01) |

(52) U.S. Cl.
CPC .... *H01M 10/0525* (2013.01); *H04N 1/00023* (2013.01); *H04N 1/00039* (2013.01); *H04N 1/00055* (2013.01); *H04N 1/00061* (2013.01); *H04N 1/00068* (2013.01); *H04N 1/00084* (2013.01); *H04N 1/00344* (2013.01); *H04N 1/00832* (2013.01); *H04N 1/60* (2013.01); *C01P 2006/11* (2013.01); *C01P 2006/14* (2013.01); *C01P 2006/16* (2013.01)

(58) Field of Classification Search
CPC ........... H04N 1/00084; H04N 1/00344; H04N 1/00832; H04N 1/60; H01M 4/587; H01M 4/366; H01M 4/625; H01M 10/0525; C01P 2006/11; C01P 2006/14; C01P 2006/16
USPC ............................. 358/1.15, 1.13, 1.14, 1.1
See application file for complete search history.

(56) References Cited

U.S. PATENT DOCUMENTS

| | | |
|---|---|---|
| 7,146,114 B2 | 12/2006 | Frankel et al. |
| 8,024,236 B2 | 9/2011 | Vitulli et al. |
| 9,134,675 B2 | 9/2015 | Yang et al. |
| 9,807,253 B2 | 10/2017 | Osadchyy |
| 2012/0254050 A1 | 10/2012 | Scrafford et al. |
| 2015/0003846 A1 | 1/2015 | Yang et al. |
| 2016/0075130 A1* | 3/2016 | Landa ................... B41J 2/0057 347/103 |
| 2017/0364085 A1* | 12/2017 | Ichikawa ........... G01C 21/3407 |
| 2018/0054530 A1 | 2/2018 | Osadchyy |

OTHER PUBLICATIONS

Microsoft Corporation, "How do I check my ink or toner levels?", Jun. 25, 2010.
J. Perlow, "HP's Instant Ink: Printing as a Service?", Sep. 2, 2015.
R. Rosario et al., "How to add periodic component to linear regression model?", Nov. 22, 2010.
H. J. Seltman, "Simple Linear Regression", Chapter 9 of "Experimental Design and Analysis", Nov. 1, 2009, pp. 217-240.
M. Tavis, "Architectural Design Patterns in Cloud Computing", Oct. 15, 2010.
K. C. Weins, "Basic Tutorial on Linear Regression and Fourier Analysis", Feb. 1, 2010.

* cited by examiner

Colorant-Usage Prediction Software 216

1000

1010 Obtain printer information related to PD1 (device information, colorant-usage information for PD1, and maintenance-event information for PD1)

1012 Generate general initial prediction components (linear, periodic, additional) regarding colorant usage, wear-off and/or colorant capacity based on device information

1014 Obtain available historical data AHD for printing devices related to PD1 (printing devices with same or similar manufacturer / model / environment)

1016 Generate related initial prediction components based on AHD

1018 Obtain PD1-specific data (page counts, colorant usage, maintenance events, no colorant, low colorant, and/or colorant change event data) about and/or from PD1

1020 Generate specific initial prediction components based on PD1-specific data and aggregate PD1-specific data into AHD

1022 Generate prediction components PC1 regarding colorant usage, PD1 wear-off and/or colorant capacity based on general initial prediction components, related initial prediction components, and/or specific initial prediction components

1024 Receive request to predict colorant usage for PD1

1026 Estimate PD1's colorant usage U1 based on prediction components PC1 regarding colorant usage, wearoff and/or colorant capacity

1028 Respond to request to predict colorant usage with estimate of colorant usage U1

FIG. 10A

| Time | PD1 | PD2 | PD3 | PD4 | ... | PDx | -2SD | -1SD | Mean | +1SD | +2SD | Conf. Int. (days) |
|---|---|---|---|---|---|---|---|---|---|---|---|---|
| 3 mo. | 3 | 2 | 8 | -9 | ... | -5 | -12.3 | -6.2 | -0.2 | 5.8 | 11.9 | [-6,+6] |
| 4 mo. | 4 | -4 | 6 | 2 | ... | 4 | -4.5 | -1.0 | 2.4 | 5.8 | 9.3 | [-1,+6] |
| 5 mo. | -3 | 7 | 4 | 0 | ... | 3 | -4.7 | -1.2 | 2.2 | 5.6 | 9.1 | [-1,+6] |
| 6 mo. | -5 | 3 | 4 | 3 | ... | 2 | -5.1 | -1.9 | 1.4 | 4.7 | 7.9 | [-2,+5] |
| 7 mo. | 1 | 2 | 3 | 2 | ... | 1 | 0.3 | 1.1 | 1.8 | 2.5 | 3.3 | [+1,+3] |
| ... | | | | | | | | | | | | |
| # of cycles | PD1 | PD2 | PD3 | PD4 | ... | PDx | -2SD | -1SD | Mean | +1SD | +2SD | Conf. Int. (days) |
| 3 cycles | 6 | 0 | -1 | 2 | ... | -9 | -10.2 | -5.3 | -0.4 | 4.5 | 9.4 | [-5,+5] |
| 4 cycles | 4 | -3 | 3 | -4 | ... | 6 | -6.7 | -2.8 | 1.2 | 5.2 | 9.1 | [-3,+5] |
| 5 cycles | 2 | -5 | 9 | -1 | ... | -6 | -11.0 | -5.6 | -0.2 | 5.2 | 10.6 | [-6,+5] |
| 6 cycles | -4 | -2 | -1 | -5 | ... | 3 | -7.4 | -4.6 | -1.8 | 1.0 | 3.8 | [-5,+1] |
| 7 cycles | -1 | 3 | 5 | 6 | ... | 0 | -2.9 | -0.1 | 2.6 | 5.3 | 8.1 | [0,+6] |
| ... | | | | | | | | | | | | |

Matrix 1090

PC1 Data 1092 (rows 3 mo. – 7 mo.)

PC2 Data 1094 (rows 3 cycles – 7 cycles)

FIG. 10D

COLORANT CHANGE PREDICTION

CROSS-REFERENCE TO RELATED APPLICATIONS

This application is a continuation of and claims the benefit of priority from U.S. patent application Ser. No. 15/785,132, filed Oct. 16, 2017, which is a continuation of and claims the benefit of priority from U.S. patent application Ser. No. 15/081,796, filed Mar. 25, 2016, all of which are hereby incorporated herein by reference in their entireties.

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can use various types of colorant to print on paper or other media. These types of colorant can include toner, inks, and dyes. These colorants can be of various colors, e.g., black, cyan, magenta, yellow. Typically, colorant for a printing device can be replaced or refilled. For example, toner of one or more colors can be replaced in many modern laser printers.

SUMMARY

In one aspect, a method for predicting printer device colorant usage is provided. A prediction server receives a request to predict colorant usage for a first printing device. The prediction server determines a first plurality of functions to predict colorant usage for the first printing device. The first plurality of functions include at least one linear function and at least one non-linear function. The first plurality of functions are based on one or more colorant-usage rates that indicate historical rates of change in colorant used by the first printing device. The prediction server determines a prediction of colorant usage for the first printing device using the first plurality of functions. The prediction server provides an output involving the prediction of colorant usage for the first printing device, where the prediction of colorant usage includes a confidence interval related to the prediction.

In another aspect, a prediction server is provided. The prediction server includes one or more processors and data storage. The data storage is configured to store computer-readable instructions that, when executed by the one or more processors, cause the prediction server to perform tasks. The tasks include: receiving a request to predict colorant usage for a first printing device; determining a first plurality of functions to predict colorant usage for the first printing device, where the first plurality of functions include at least one linear function and at least one non-linear function, and where the first plurality of functions are based on one or more colorant-usage rates that indicate historical rates of change in colorant used by the first printing device; determining a prediction of colorant usage for the first printing device using the first plurality of functions; and providing an output involving the prediction of colorant usage for the first printing device, where the prediction of colorant usage includes a confidence interval related to the prediction.

In another aspect, an article of manufacture is provided. The article of manufacture includes a non-transitory computer readable medium that is configured to store computer-readable instructions. The computer-readable instructions, when executed by one or more processors of a prediction server, cause the prediction server to perform tasks. The tasks include: receiving a request to predict colorant usage for a first printing device; determining a first plurality of functions to predict colorant usage for the first printing device, where the first plurality of functions include at least one linear function and at least one non-linear function, and where the first plurality of functions are based on one or more colorant-usage rates that indicate historical rates of change in colorant used by the first printing device; determining a prediction of colorant usage for the first printing device using the first plurality of functions; and providing an output involving the prediction of colorant usage for the first printing device, where the prediction of colorant usage includes a confidence interval related to the prediction.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 10A shows a flowchart illustrating a colorant replacement prediction algorithm, according to an example embodiment.

FIG. 10D shows an example matrix, according to an example embodiment.

DETAILED DESCRIPTION

Figure 1:
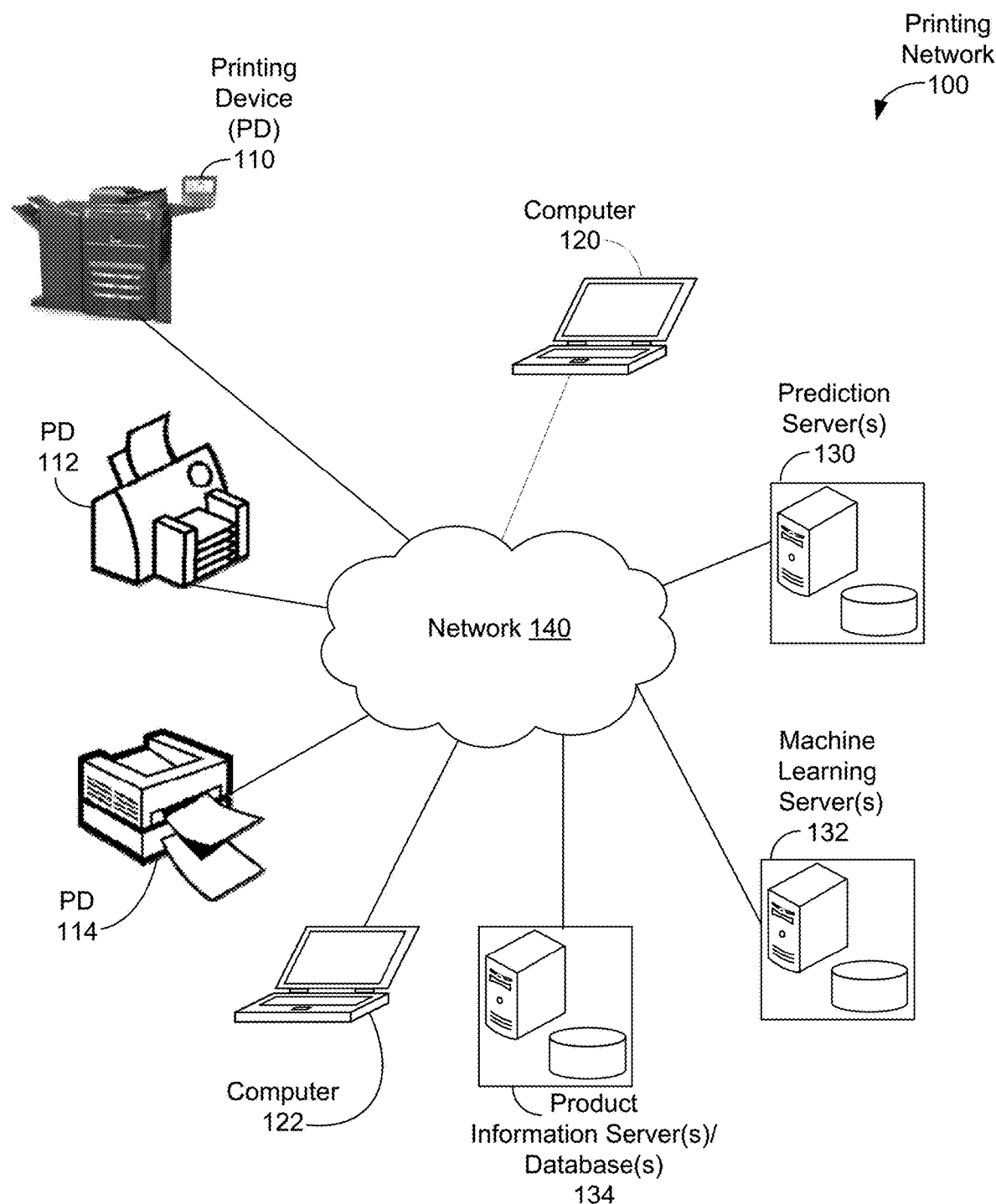
FIG. 1 is a diagram illustrating a printing network, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example apparatus and methods are described herein related to predicting colorant usage in printing devices. A printing device commonly uses colorant, such as toner, ink, or dye, as part of the printing process. Each printing device can have a certain amount of colorant available for printing a number of pages before the colorant has to be replaced, for example, a laser printer can have a toner cartridge that is rated for printing 10,000 pages before replacement.

Rated capacity of colorant can be calculated based on a predetermined rated percentage, such as 5%, of coverage. However, the rated amount of colorant may not be accurate; for example, the types of printing jobs, the maintenance status of the printer, the amount of colorant available to the printer, and other factors can affect how many pages can be printed by a printing device before colorant replacement. That is, actual printing can result in replacing colorant after more (or fewer) pages have been printed at a different coverage than the predetermined rated percentage; e.g, printing output can lead to an earlier colorant replacement at 10% or 20% coverage, as well as later replacement at 1%, 2%, etc. of coverage.

An accurate prediction of colorant usage taking at least these factors into account can lead to timely replacement of colorant, avoiding poorly printed images or even forced shutdown of a printing device due to lack of colorant. The prediction of toner usage can guide ordering and delivery of replacement colorant in a just-in-time basis, leading to both better printer performance and smaller expenditures for spare colorant. Another factor contributing to making an accurate prediction of colorant usage is the method used to measure the colorant usage. Some printing devices have physical (analog) sensors to detect colorant—these sensors can have discrete ranges which may or may not be accurately reflected when sensor readings are digitized. Other printing devices do not have physical sensors to detect colorant; rather, these printing devices can calculate colorant moved onto paper based on a number of dots printed on the paper. However, without use of physical sensors, these printing devices can disregard the loss of wasted toner and/or any variations in dot sizes in printed pages. Thus, printing devices without sensors can make inaccurate determinations of colorant usage.

The herein-described techniques for predicting colorant can take into account actual colorant usage by a particular printing device, colorant usage by printing devices having the same manufacturer, model, and/or other device characteristics, colorant usage by co-located and/or co-owned devices, colorant replacement events, and printing device maintenance events. For example, a particular printing device PD1 can provide a prediction server with printer information that can include: (1) device information; e.g., manufacturer-supplied data about PD1 such as product specification data about PD1, dictionary data about PD1, PD1's manufacturer, model, and/or other device characteristics, (2) colorant-usage information; e.g., PD1's toner level information or ink level data, and/or (3) maintenance-event information; e.g., information about toner cartridge or ink replacement for PD1, fuser replacement if PD1 uses toner, nozzle replacement if PD1 uses ink. The prediction server can then take the printer information (e.g., some or all of the device information, colorant-usage information, and/or maintenance-event information) from PD1 and other printing devices to estimate colorant usage by PD1.

Along with estimating colorant usage, the prediction server can provide a confidence interval about the estimate. For example, suppose that the prediction server generates a prediction that PD1 will need toner in 35 days, where this 35-day estimate is within a range of 30 to 45 days. Then, for this example, the prediction server can provide an estimate indicating PD1 will need toner in 35 days with a confidence interval of [−5, +10] days; that is, PD1 will need toner within a range between 35−5=30 days and 35+10=45 days.

The estimate of colorant usage can be based on one or more functions that can include one or more "prediction components", or functions estimating colorant usage. The functions can include one or more linear functions and one or more non-linear functions. Then, the prediction components can include linear prediction component(s) and/or non-linear prediction component(s). The non-linear prediction component(s) can include periodic prediction component(s). The linear prediction component(s) and/or periodic prediction component(s) can be determined based on regression techniques operating on printer data, such as (historical) values of colorant usage. For example, a Fourier regression technique can be applied to colorant usage values received from a printing device, such as PD1 discussed above, to determine one or more linear prediction components and one or more periodic prediction components. These periodic components can have daily, weekly, monthly, yearly, and perhaps other periods. For example, a printing device Work1 can be used heavily during a work week and sparingly or not at all during a weekend. Then, colorant usage for printing device Work1 can have a weekly periodic prediction component indicating more usage during the work week and less usage during weekends.

Such linear and non-linear/periodic prediction components can be determined by the prediction server applying regression techniques to device information, colorant-usage information, maintenance-event information, and/or other information provided by printing device(s) associated with the prediction server. The information received by the prediction server can be filtered to remove outlying data; e.g., colorant usage values that are too high and/or too low in comparison to one or more thresholds. Some information can be transformed from absolute to relative values; for example, suppose a printing device provides toner-remaining percentages such as: 24.5%, 24.5%, 24.2%, 23.9%, 23.8%, 23.4%, 23.2%, and 23.2% The prediction server can convert the percentage values to relative values indicating toner usage percentage per day by taking differences between the toner-remaining percentages—in this example the relative values indicating toner usage percentage per day are: 0%, 0.3%, 0.3%, 0.1%, 0.4%, 0.2%, and 0%.

When colorant, such as a toner cartridge, is replaced, the remaining colorant level can increase; e.g., the replaced colorant level can become 100%. A replacement event can be determined by when an absolute value of a difference between two measured usage values exceeds a threshold related to colorant replacement; e.g., a predetermined percentage such as 40%, 50%, 55%, 60%. Continuing the example above, an absolute value of a difference exceeding the threshold can be distinguished and then filtered from the absolute value of usual differences, such as the differences of 0%, 0.3%, 0.3%, 0.1%, 0.4%, 0.2%, and 0% shown above. That is, if a first (earlier-measured) usage level is 35% or less and a second (later-measured) usage level measured after colorant was replaced was (nearly) 100%, the difference between the first and second usage levels would exceed 65% and so exceed a threshold indicating colorant replacement. In some cases, a printing device can fail to report usage levels for some time after colorant replacement, and so the predetermined percentage can be less than 100%; e.g., a value between 55%-95%. Using relative colorant usage values, such as differences between daily (or other measured) toner values, allows for simplified logic in processing printer data and prediction of colorant usage.

After filtering and determining relative values of the device information, colorant-usage information, maintenance-event information, and/or other information provided by printing device(s), the prediction server can determine linear and non-linear components using regression techniques, such as linear regression and/or the above-mentioned Fourier regression. Then, the prediction server can use the linear and non-linear components to estimate colorant usage for the printing device.

In some cases, the device information, colorant-usage information, maintenance-event information, and/or other information can be combined with information from other printing devices that have similar device information; e.g., have the same manufacturer and/or model, use the same driver software, etc. In other cases, the device information, colorant-usage information, maintenance-event information, and/or other information can be combined with information from co-located printing devices and/or from printing devices with similar workloads; e.g., printing devices owned and/or operated by the same entity that may or may not be co-located. In still other cases, estimates for one printing device can be compared and/or combined with estimates from printing devices that have similar device information, estimates from printing devices that are co-located, and/or estimates from printing devices with similar workloads—that is, the raw information from each device can remain separated, but the estimates (e.g linear components, non-linear components) can be compared and/or combined.

The herein-described techniques do not directly rely upon comprehensive physical sensors to determine and report colorant levels. Rather, these techniques can utilize the information provided by the printing device and determine estimates based on the provided information. For example, suppose a printing device only reports a few levels of colorant usage—full, nearly full, nearly empty, and empty. Then, these levels can be converted to numeric values; e.g., full=3, nearly full=2, nearly empty=1, and empty=0—and linear and non-linear components can be determined after filtering these absolute numerical values and/or corresponding relative numerical values. As such, the herein-described techniques can be adapted to many different types of printing devices utilizing different types of colorant to provide accurate estimates of colorant usage.

II. Printing System Examples

FIG. 1 is a diagram illustrating printing network 100, according to an example embodiment. Printing network 100 includes printing devices (PDs) 110, 112, 114, computers 120, 122, one or more prediction servers 130, one or more machine learning servers 132, and one or more product information servers/databases 134 interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In an example embodiment, some or all printing devices 110, 112, 114 can be connected to network 140 through one or more, possibly different, network protocols. Data can be transmitted between printing devices 110, 112, 114, computers 120, 122, prediction server(s) 130, machine learning server(s) 132, and product information servers/databases 134 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 120, 122, prediction server(s) 130, machine learning server(s) 132, and/or product information servers/databases 134 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, prediction server(s) 130, machine learning server(s) 132, and/or product information servers/databases 134 to inform other devices about colorant-usage, maintenance, error, and/or other conditions of the printing devices; e.g., idle, printing, sleeping, paper jam, low or out of paper, low or out of toner/ink, etc. Other communications between computers 120, 122, prediction server(s) 130, machine learning server(s) 132, and/or product information servers/databases 134, such as, but not limited to, requests for colorant-usage predictions and corresponding responses, are possible as well.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., FTP, HTTP, JMS, KPDL, PCT, PDF, SOAP, SMS, SMTP, SNMP, TCP/IP, UDP, LDAP, MQ, and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100. In particular, computers 120, 122 can provide displays related to maintaining printing devices, including displays related to colorant usage for printing devices and/or predictions related to colorant usage, where the printing devices can include but are not limited to printing devices 110, 112, 114.

One or more prediction servers 130 can at least receive requests for predicting colorant usage and generate corresponding predictions of colorant usage related to printing devices that may be connected to network 140 and/or other networks; e.g., remotely accessible printing devices via a private network such as a VPN and/or LAN not directly connected to network 140, Internet-accessible printing devices that may or may not have access to network 140.

Machine learning server(s) 132 can provide functionality for learning patterns, trends, and/or features about data, particularly related to printing devices, such as printing devices 110, 112, 114. Based on the learned patterns, trends, and/or features, machine learning server(s) 132 can generate outputs, such as predictions about the printing devices including but not limited to predictions of colorant usage by the printing devices.

Product information server(s)/database(s) 134 can store and retrieve data related to printing network 100, including data about printing devices 110, 112, 114, and perhaps other devices. The data can include device information, colorant-usage information, maintenance-event information, and/or other information related to devices related to printing network 100. Data can be retrieved from product information server(s)/database(s) 134 in response to a received query (or queries) requesting information about specific device(s), colorant usage, maintenance events, and/or other information.

In some embodiments, one or more computing devices, e.g., one or more servers, can be configured to perform some or all of the herein-described functionality of prediction server(s) 130, machine learning server(s) 132, and product information server(s)/database(s) 134. For example, one or more computing devices, perhaps acting as server(s), can be used to provide the herein-described functionality of prediction server(s) 130, machine learning server(s) 132, and product information server(s)/database(s) 134.

In other embodiments, prediction server(s) 130, machine learning server(s) 132, and/or product information server(s)/database(s) 134 can provide additional services than those discussed above, such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 100.

For example, one or more of prediction server(s) 130, machine learning server(s) 132, and product information server(s)/database(s) 134 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 140. The jobs processed by a print server 132 can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by cloud server(s) 130 and/or print server(s) 132, and perhaps other data.

Figure 2A:
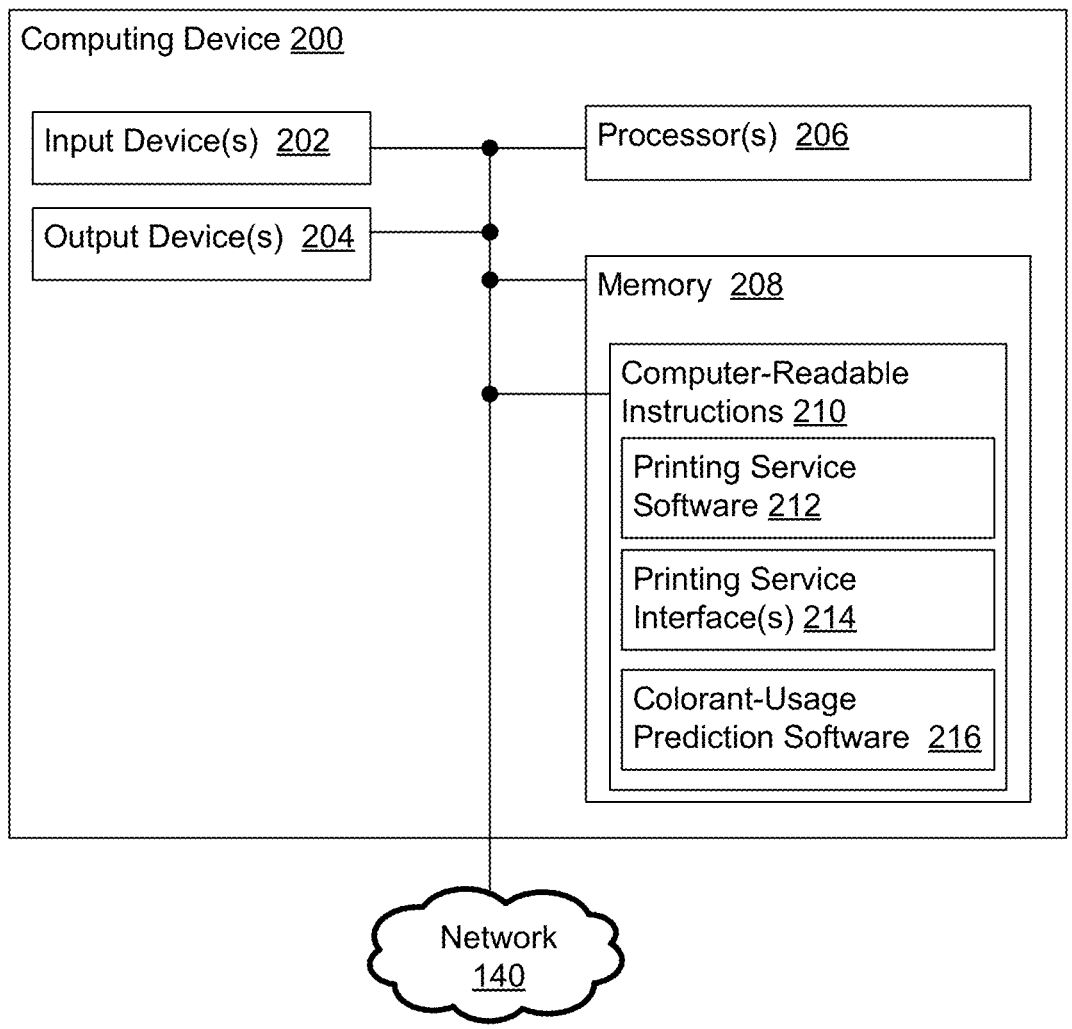
FIG. 2A is a schematic block diagram illustrating a computing device, according to an example embodiment.

FIG. 2A is a schematic block diagram illustrating computing device 200, according to an example embodiment. In some embodiments, computing device 200 can be configured to perform one or more herein-described functions of: printing network 100, printing devices 110, 112, 114, computers 120, 122, prediction server(s) 130, machine learning server(s) 132, product information server(s)/database(s) 134, network 140, computing devices 200a-200i, database memory 208a, service architecture 230, methods 300, 1000, 1030, and/or 1200, toner replacement prediction algorithm 380, displays 1110, 1140, linear, non-linear, and/or periodic prediction components, as well as part of or the entire herein-described functionality related to the graphs shown in FIGS. 4A-9 and/or scenario 1100.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, GPS sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include one or more computer-readable storage media configured to store data and/or instructions that can be read and/or accessed by at least one of processors 206.

The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, functions of herein-described devices, networks, methods, features, and scenarios. In some embodiments, computer-readable instructions 210 can include instructions that, when executed, can perform part or the entire herein-described functionality of printing device 110 and/or converter 304.

In some embodiments, computer-readable instructions 210 can include at least instructions for printing service software 212, printing service interface(s) 214, and/or colorant-usage prediction software 216. Printing service software 212 and printing service interface(s) 214 can be scaled horizontally over multiple computing devices 200 as a platform as a service (PaaS) and thus provide virtually unlimited performance. Multiple components can be involved in the present prediction function that can require intense calculations, whereas prediction results can be time sensitive and so should be provided quickly. Colorant-usage prediction software 216 can provide functionality related to predicting colorant usage by one or more printing devices. In some embodiments, colorant-usage prediction software 216 can carry out part of all of the functionality described with respect to method 300.

Figure 2B:
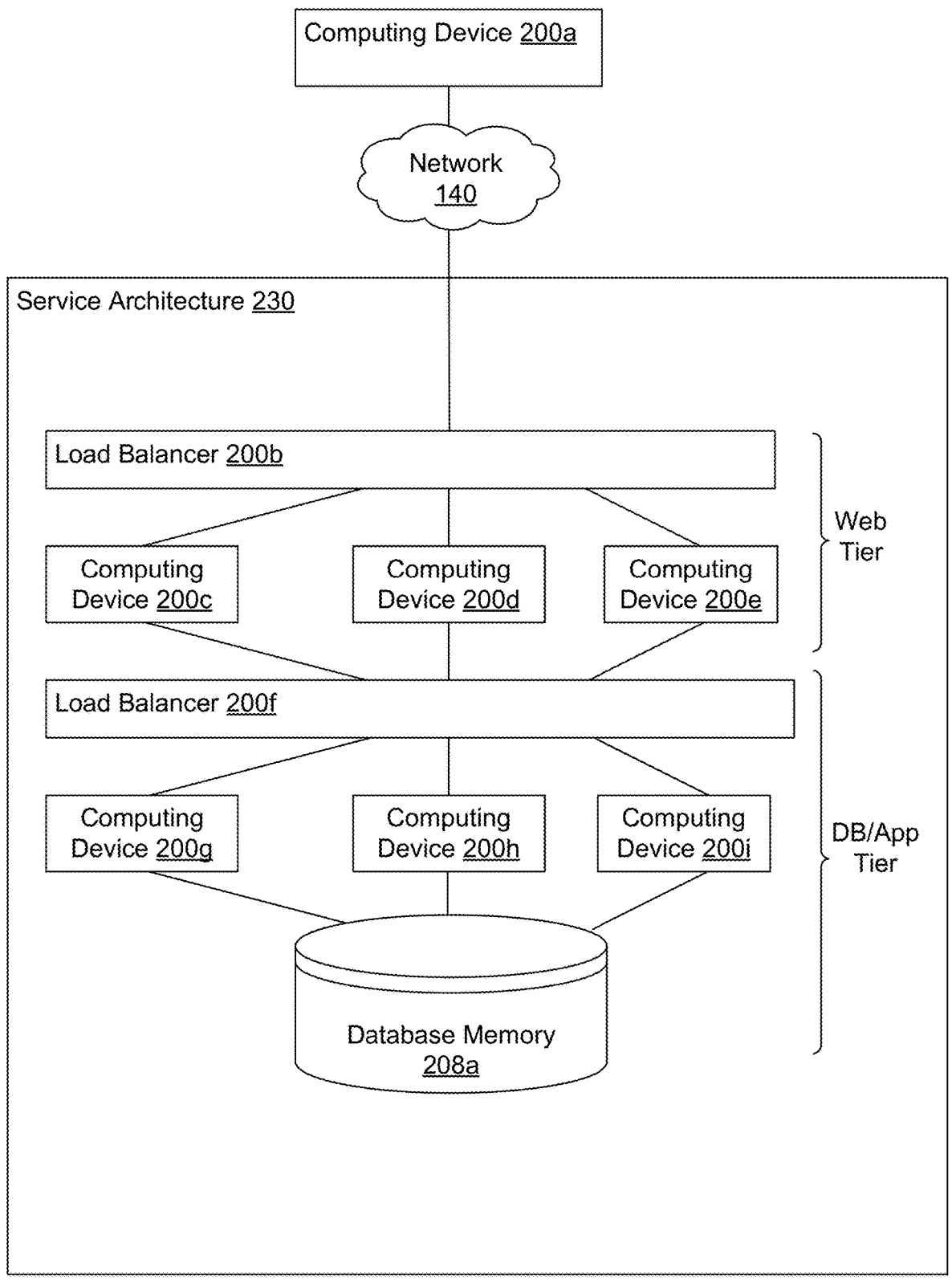
FIG. 2B is a schematic block diagram illustrating a computing device connected to a service architecture, according to an example embodiment.

FIG. 2B is a schematic block diagram illustrating a computing device 200a connected to service architecture 230 via network 140, according to an example embodiment.

Service architecture 230 can implement one or more servers, such as but not limited to, prediction server(s) 130, machine learning server(s) 132, product information server(s)/database(s) 134, and print server(s). The one or more servers implemented by service architecture 230 can provide one or more services, such as but not limited to, printing as a service (PaaS), other printing services, web services, content-delivery services, and on-line commerce services. Many other servers and/or services can be implemented and/or provided by service architecture 230 as well.

In some embodiments not shown in FIG. 2A, network 140 can communicate with service architecture 230 using one or more firewalls. A firewall includes one or more computing devices configured to enable authorized communications while blocking unauthorized communications. Typical authorized communications include communications related to the one or more services provided by service architecture 230. Typical unauthorized communications include any communications that are not part of the authorized communications; that is, communications unrelated to the one or more services provided by service architecture 230.

Computing device 200a can be a computing device configured to connect to and communicate using network 140; e.g., computing device 200a can include some or all of the components and/or functionality of computing device 200 discussed above in the context of FIG. 2A. In particular, computing device 200a can be configured to communicate with service architecture 230 to request and/or receive the one or more services provided by service architecture 230.

FIG. 2B shows that service architecture 230 includes a web tier and a database/application (DB/App) tier. The web tier can communicate with network 140, computing device 200a, and/or other computing devices. For example, the web tier can be used to receive requests for one or more services from computing device 200a (via network 140) and to send responses related to providing the one or more services to computing device 200a (via network 140) of service architecture 230. The database/application tier can have enough computing power and data storage to provide the one or more services for service architecture 230.

FIG. 2B illustrates that the web tier includes load balancer 200b and computing devices 200c, 200d, 200e and that the database/application tier includes load balancer 200f, computing devices 200g, 200h, 200i, and database storage 208a. In some embodiments, some or all of load balancers 200b, 200f and computing devices 200c, 200d, 200e, 200g, 200h, 200i can include some or all of the components and/or functionality of computing device 200 discussed above in the context of FIG. 2A.

Database storage 208a can include sufficient computer-readable storage, perhaps implemented in one or more databases, to carry out the one or more services of service architecture 230. In some embodiments, database storage 208a can include some or all of the components and/or functionality of memory 208 discussed above in the context of FIG. 2A.

Load balancer 200b of the web tier can receive communications from network 140 and distribute the communications between one or more computing devices of the web tier; e.g., computing devices 200c, 200d, 200e. For example, upon receiving an incoming communication from network 140, then load balancer 200b can select one of computing devices 200c, 200d, 200e to service the communication. The selected computing device can perform one or more actions required to service the request—either directly by itself or indirectly by way of the application/database tier. After the one or more actions are performed, the selected computing device can generate a response including results related to the requested one or more services, and send the response with the results to network 140 via load balancer 200b. In some embodiments, the selected computing device can send the response directly to network 140.

In some embodiments, the web tier can include multiple load balancers. In other embodiments, the web tier can include more or fewer computing devices than shown in FIG. 2B. In still other embodiments, functionality of load balancer 200b can be combined with and/or spread across functionality of computing devices 200c, 200d, 200e. In even other embodiments, the web tier can include one or more virtualized computing devices along with or instead of some of computing devices 200c, 200d, 200e.

The one or more computing devices 200c, 200d, 200e in the web tier can process communications with network 140 by accepting incoming communications from network 140 and send outgoing communications to network 140. If an incoming communication from network 140 and/or an internal communication within service architecture 230 requires processing by the application/database tier, then the computing device of computing devices 200c, 200d, 200 processing the communication can generate and send a new communication and/or forward the communication to the database/application tier for the required information and/or computing services.

In some embodiments not shown in FIG. 2A, the web tier communicate with the database/application tier via access-control software and/or hardware that limits communications and/or access to the database/application tier. The access-control software and/or hardware can protect the database/application tier from receiving more communications, particularly requests for data and/or computing services, than can be processed by the database/application tier. For example, the access-control software and/or hardware can throttle communications between the web tier and the database/application tier.

Load balancer 200f of the database/application tier can receive communications from the web tier and distribute the communications between one or more computing devices of the database/application tier; e.g., computing devices 200g, 200h, 200i. For example, if an incoming communication from the web tier is a request for a service of the one or more services provided by the database/application tier, then load balancer 200f can select one of computing devices 200g, 200h, 200i to service the request. The selected computing device can perform one or more actions required to service the request—either directly by itself or indirectly by way of the web tier. After the one or more actions are performed, the selected computing device can generate a response including results related to the requested service, and send the response with the results to the web tier via load balancer 200f. In some embodiments, the selected computing device can send the response directly to the web tier.

In some embodiments, the database/application tier can include multiple load balancers. In other embodiments, the database/application tier can include more or fewer computing devices than shown in FIG. 2B. In still other embodiments, functionality of load balancer 200f can be combined with and/or spread across functionality of computing devices 200g, 200h, 200i. In even other embodiments, the web tier can include one or more virtualized computing devices along with or instead of some of computing devices 200g, 200h, 200i.

The one or more computing devices 200g, 200h, 200i in the database/application tier can process communications with the web tier by accepting incoming communications from the web tier, performing data and/or information services related to the incoming communications, generate responses including results of performed data and/or information services, and send outgoing responses to the web tier.

III. Techniques for Predicting Colorant Usage

Figure 3:
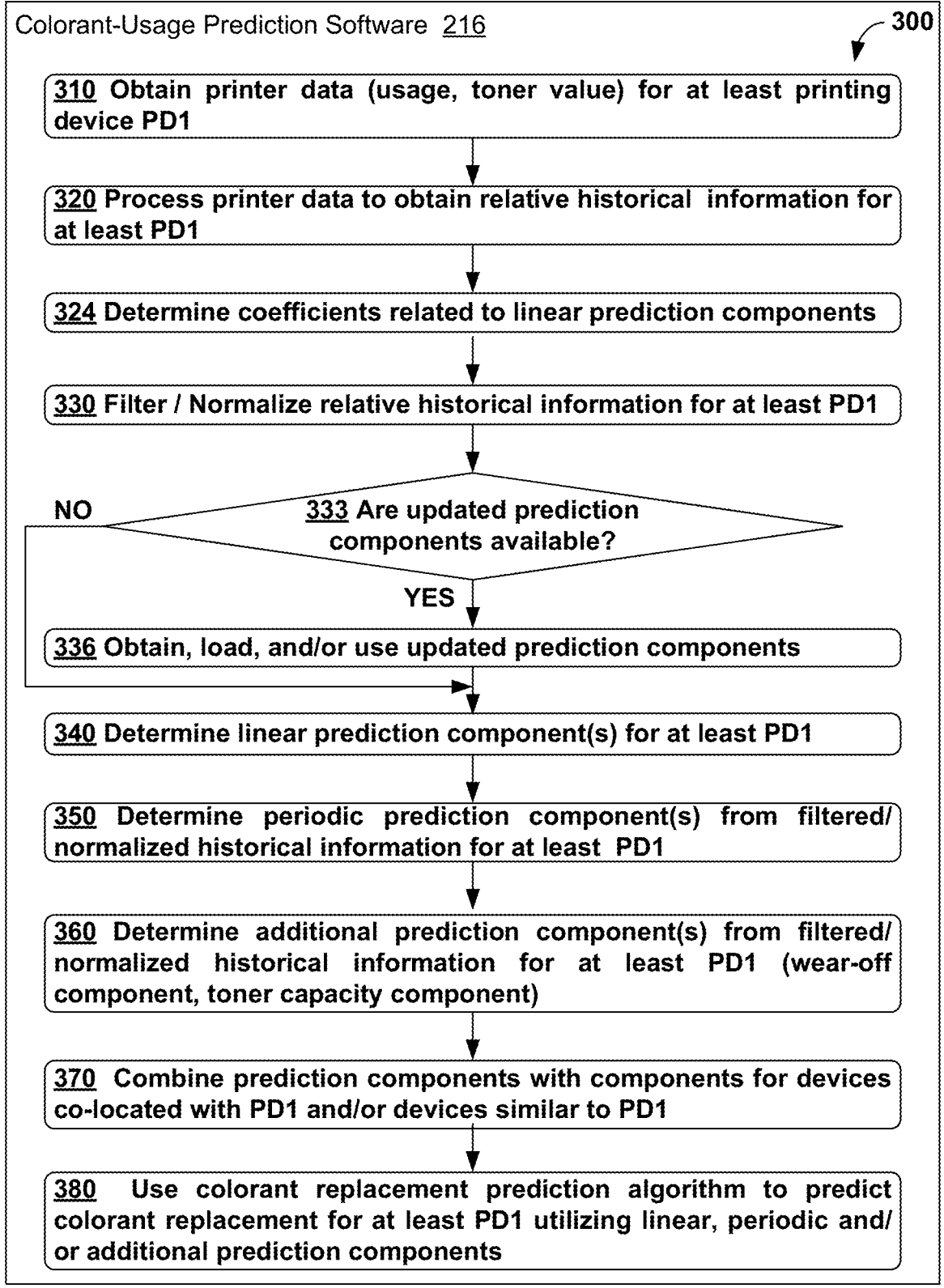
FIG. 3 shows a flowchart of a method executable by colorant-usage prediction software, according to an example embodiment.

FIG. 3 shows a flowchart of a method 300 executable by colorant-usage prediction software 216, according to an example embodiment. Method 300 can be carried out by a computing device 200; e.g. by one or more computing devices acting as prediction server(s) 130 executing colorant-usage prediction software 216 and/or other software configured to carry out the functionality of method 300.

Method 300 can begin at block 310, where colorant-usage prediction software 216 can obtain printer data for at least a printing device PD1. In some embodiments, examples of printer data include device information, colorant-usage information, and/or maintenance-event information. In some embodiments, printing device PD1 can provide printer data on a periodic basis; e.g., hourly, daily, weekly, monthly, and/or yearly. For example, PD1 can provide printer information, including usage data and colorant-usage information on a daily (or other periodic) basis. The usage data can include information such as a number of pages printed per day (or other period of time) and/or a number of pages scanned per day (or other period of time). The colorant-usage information provided on a daily (or other period of time) basis can include information about one or more amounts of toner available to the printing device, one or more amounts of ink available to the printing device, and/or information about low and/or no toner available events. In the example that PD1 is a black-and-white printer, one type of toner or ink is likely to be used; e.g., black toner or ink, and so the colorant-usage information likely includes information about black toner or ink available to PD1 and/or information about low or no black toner or ink available to PD1. In the example that PD1 is a color printer, multiple types of toner or ink are likely to be used; e.g., cyan, magenta, yellow, and black toners or inks, and so the colorant-usage information likely includes information about multiple toners or inks available to PD1 and/or information about low or no colorant values for each type of toner or ink available to PD1.

PD1 can provide device information on a daily (or other periodic) basis. The device information can include, but is not limited to information about a name, manufacturer, model, network address(es) (e.g., Internet Protocol (IP) address, Media Access Control (MAC) address), asset number(s), serial number(s), physical location, duty cycle information such as information about a minimum, a maximum, and/or an average number of pages printable by the printing device per month (or other time period), maintenance cycle information such as data related to component replacement timing, and/or other information specifying or otherwise indicating characteristics of the device PD1. Device information can include colorant-related information, including toner (or other colorant) capacity information, such as initial toner (or other colorant) capacity, replacement toner (or other colorant) capacity, number of toner cartridges (or other colorant storage components), Maintenance-event information provided on a daily (or other periodic) basis can include a number of maintenance events that occurred during the day (or other period of time), such as component replacements, power cycles, colorant changes, and/or other maintenance-related events.

In other embodiments, printing device PD1 can provide printer data on another basis rather than periodic; e.g., some or all printer data is provided by PD1 after receiving a request for some or all printer data, in response to a maintenance event; e.g., PD1 generates a report after a power cycle, toner replacement, or other maintenance event. Other printer data and/or other techniques for providing printer data can be provided and/or utilized as well.

Figure 4A:
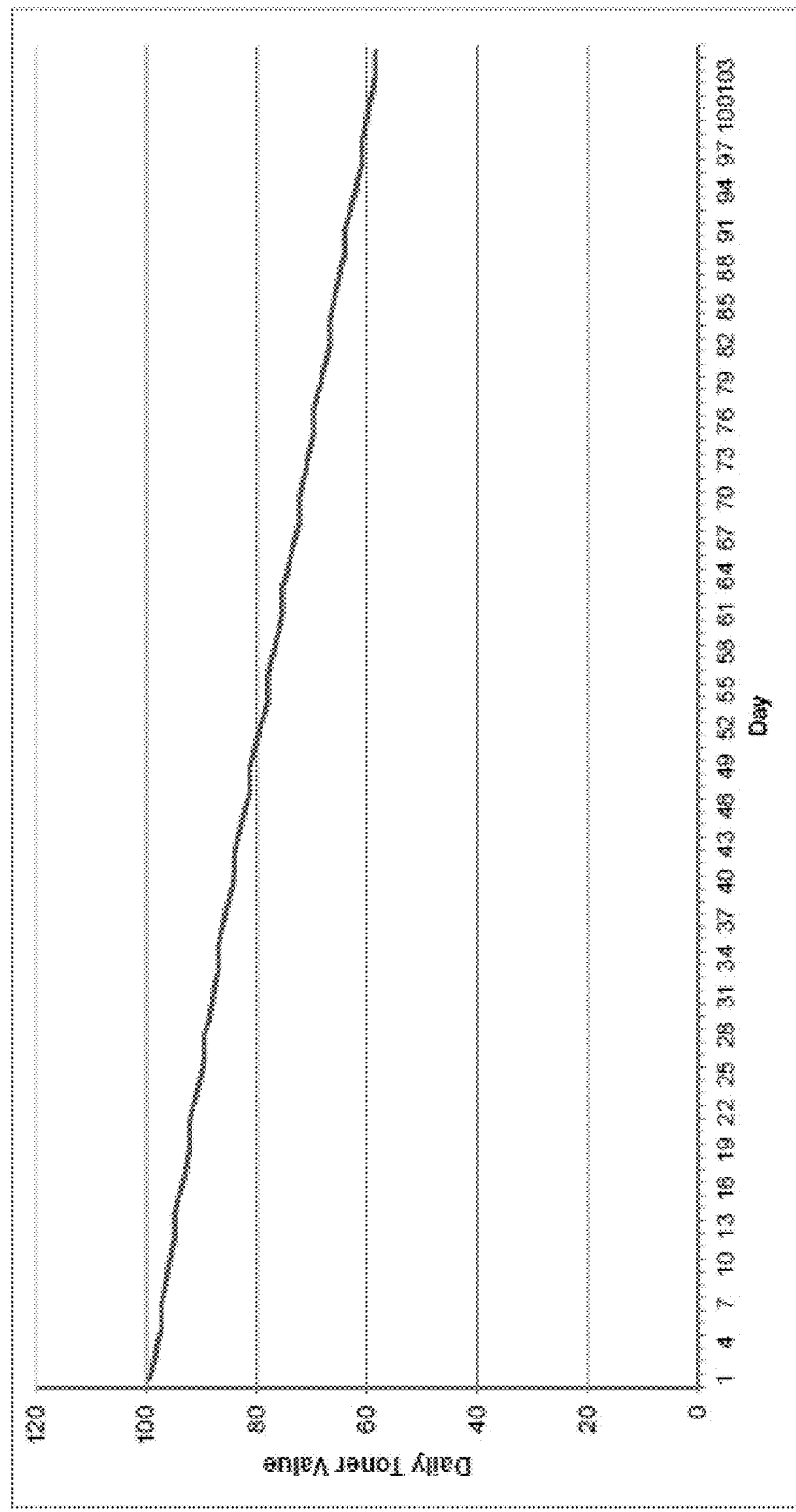
FIG. 4A shows a daily graph of toner values for an example printing device, according to an example embodiment.

To illustrate colorant value data received by the prediction server from PD1, FIG. 4A shows a daily graph of toner values for PD1, according to an example embodiment. This graph, which can be associated with block 310, indicates a percentage of toner remaining available to printing device PD1. In particular, the graph of FIG. 4A shows daily toner values for PD1 at the end of each of 105 days of operation. FIG. 4A illustrates toner values of PD1, such as at the end of day 1 of operation, 99.5% of a full toner cartridge remains available to PD1, and at the end of day 51, 80% of the full toner cartridge remains available to PD1.

Figure 4B:
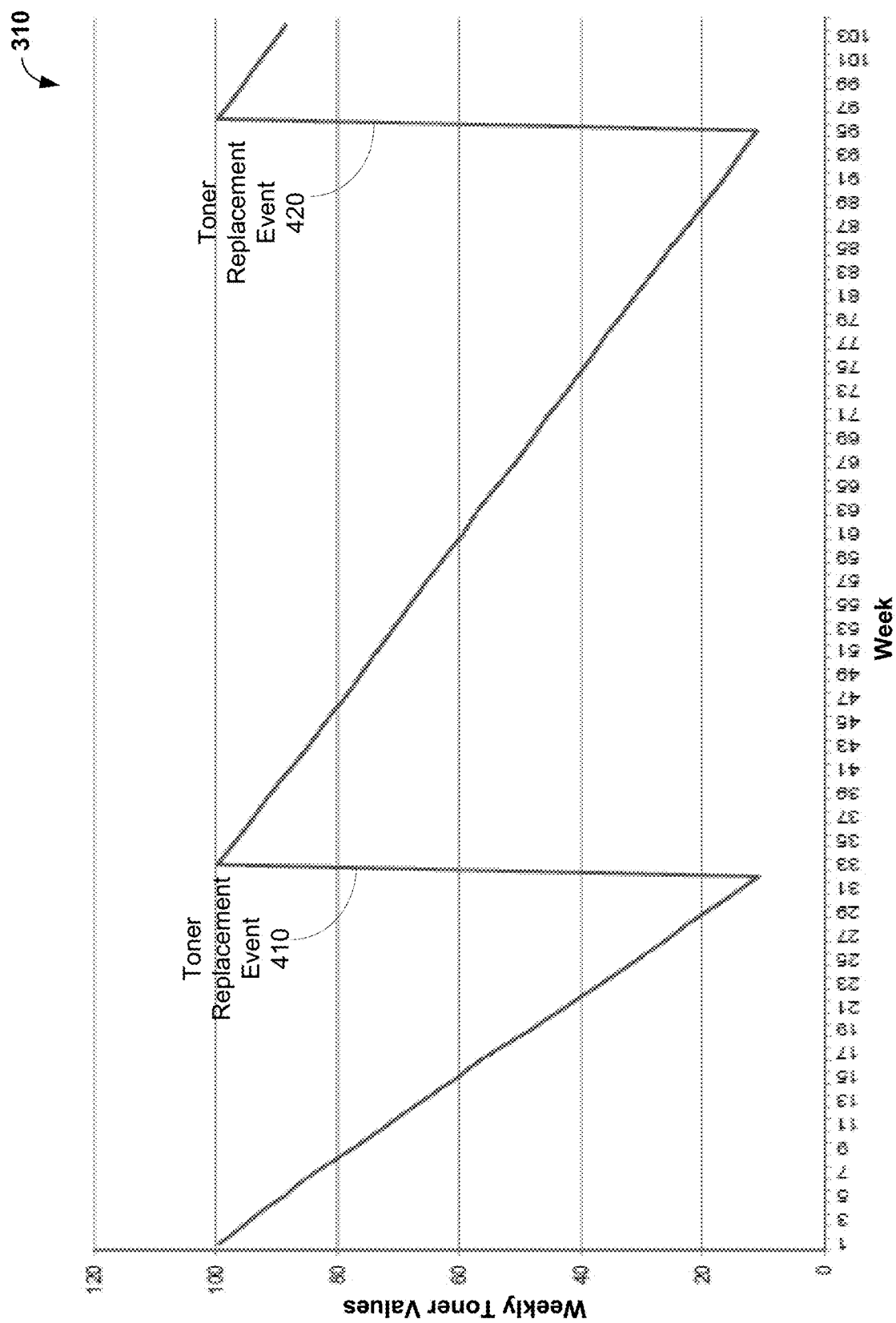
FIG. 4B shows a weekly graph of toner values for an example printing device, according to an example embodiment.

As another example, FIG. 4B shows a weekly graph of toner values for an example printing device, according to an example embodiment. The graph of FIG. 4B, which also can be associated with block 310, indicates a percentage of toner remaining available to printing device PD1 on a weekly basis. In particular, the graph of FIG. 4B shows weekly toner values for PD1 at the end of a Monday for each of 105 weeks of operation. FIG. 4B illustrates toner values of PD1, such as on the end of Monday of week 1 of operation, 99.5% of a full toner cartridge remains available to PD1, and at the end of Monday of week 51 of operation, 73.5% of the full toner cartridge remains available to PD1.

FIG. 4B also illustrates toner replacement events. For example, the graph of FIG. 4B, shows that at the end of Monday of week 32, 10.7% of a full toner cartridge remained available to PD1 and at the end of Monday of week 33, 99.6% of a full toner cartridge remained available to PD1. This toner cartridge change is illustrated by a nearly vertical line marked as toner replacement event 410 in FIG. 4B. FIG. 4B also shows another toner replacement event 420 between weeks 95 and 96 of operation of PD1. Thus, FIG. 4B illustrates that, in 105 weeks of operation, PD1 had its toner cartridge replaced twice: a first replacement between the end of Monday on week 32 and the end of end of Monday on week 33, and a second replacement between the end of Monday on week 95 and the end of end of Monday on week 96.

Returning to FIG. 3, at block 320, colorant-usage prediction software 216 can process received printer data to obtain relative historical information for at least printing device PD1. For example, the printer data can include colorant-usage values obtained over time, and thus, the colorant-usage values can be absolute historical information. Then, the absolute historical information; e.g., colorant-usage values, can be processed to obtain relative historical information, such as differences in colorant-usage values. In some embodiments, a difference between an older colorant-usage value and a newer colorant-usage value can be used to determine a relative colorant-usage value indicating how much colorant was used by PD1 in a time interval between the two measurements.

For example, if colorant-usage prediction software 216 receives printer data including toner usage values on a daily basis such as indicated in FIG. 4A, then colorant-usage prediction software 216 can take a difference between toner usage values received on two successive days to determine how much toner was used per day. As a specific example, FIG. 4A indicates that toner values received on days 1 through 3 were (in order): 99.5%, 98.8%, 98.3%. Then, to determine how much toner was used between the day 1 and day 2 measurements, a difference can be determined as: 98.8% (day 2 toner value)−99.5% (day 1 toner value)=−0.7% of available toner used between the day 1 and day 2 measurements. Similarly the amount of toner used between the day 2 toner value measurement of 98.8% and the day 3 toner value measurement of 98.3% would be 98.3−98.8=−0.5%. In some embodiments, a difference can be taken between the older measurement and the newer measurement which has the same absolute value, but an opposite sign (positive or negative) than the difference between the newer measurement and the older measurement.

In some embodiments, the differences can be further related to an expected value (or values) of colorant usage. For example, suppose that observations of printing devices co-located with and/or having the same and/or similar device characteristics as PD1 indicate that an expected value of −0.5% of toner is used on a per-weekday basis. Using the example above, the day 1 to day 2 difference of −0.7% could then indicate that, relatively, PD1 used 0.2% more toner than expected by taking the difference between the expected value of −0.5% and the observed day 1 to day 2 difference of −0.7%. Continuing the example above, the observed day 2 to day 3 difference of −0.5% matches the expected value of −0.5% of toner being used, and so the day 2 to day 3 difference from the expected value is 0. Other techniques for determining relative colorant-usage values based on absolute and/or observed colorant-usage values are possible as well.

Figure 5:
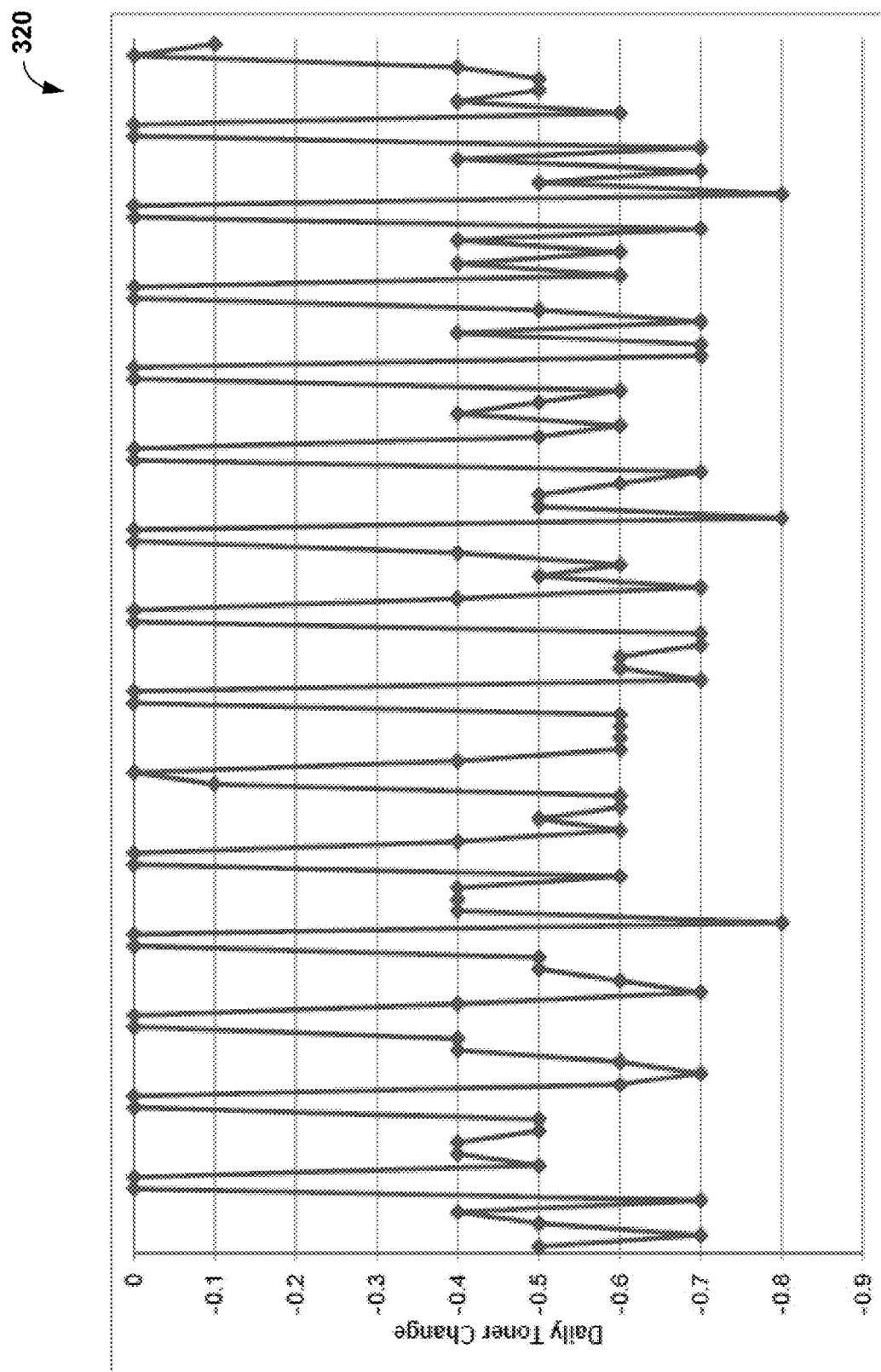
FIG. 5 shows a graph of daily changes in toner values for an example printing device, according to an example embodiment.

FIG. 5 shows a graph of daily changes in toner values for PD1, according to an example embodiment. Each daily change value shown in FIG. 5 was determined by taking a difference between the day N+1 and the day N toner value measurements shown in FIG. 4A, with N=0, 1, . . . 104, where the day 0 toner value is assumed to be 100%. For example, at the left side of FIG. 5, the first value shown indicates a daily toner change of −0.5% when N=0 by taking the difference between the day 1 toner value measurement of 99.5% and the day 0 toner value measurement of 100%=99.5%−100%=−0.5%. The next value shown in FIG. 5 indicates a daily toner change of −0.7% when N=1; which can be determined by taking the difference between the day 2 toner value measurement of 98.8% and the day 1 toner value measurement of 99.5%=98.8%−99.5%=−0.7%.

Returning to FIG. 3, at block 324, colorant-usage prediction software 216 can determine one or more coefficients for a linear prediction component. The one or more coefficients can be provided by a linear regression technique. For example, the one or more coefficients provided by the linear regression technique can include an x-intercept coefficient, a slope coefficient, and an error coefficient. The x-intercept coefficient, sometimes called a "b" coefficient, indicates a value where a line representing the linear prediction component would cross the x-axis. The slope coefficient, sometimes called an "m" coefficient, can specify a rate of change between a dependent (y) variable and an independent (x) variable. The error coefficient, sometimes called epsilon, can estimate an amount of error in the estimate provided by the linear prediction component.

These coefficients can be specified in terms of different units depending on whether the coefficients are standardized or unstandardized. Standardized coefficients can be specified in terms of standard deviation units, while unstandardized coefficients can be specified in the same units used by data used as an input to the linear regression technique; e.g., units related to daily (or other) changes in toner values.

The one or more coefficients can be used for filtering, linear, and/or non-linear prediction components Some or all of the coefficients can be used to abstract a prediction component from the data used as inputs to the prediction component; for example, once the one or more coefficients for the linear prediction component are determined, then the one or more coefficients can succinctly represent a number of data values used as inputs to the linear regression technique. Also the linear prediction component generated using toner value data from a particular printing device (or devices) can be used for different but somehow similar printing devices. For example, a linear prediction component generated from data obtained from a number of printing devices all having a particular manufacturer and model, can be used to predict performance of a different printing device having the same manufacturer and model. Also, some algorithms based on the use of linear prediction components, such as method 300, can be successfully used or reused even if coefficients of linear prediction components change.

At block 330, colorant-usage prediction software 216 can filter and/or normalize the relative historical information, such as differences in colorant-usage values, for at least printing device PD1. The relative historical information can be filtered based on one or more thresholds; e.g., values can be filtered out, or excluded, as being greater than an upper-bound threshold, as being less than a lower-bound threshold, or as being outside of a range between a lower-bound and an upper-bound threshold. If a value is not filtered out, the value can then be filtered in, or included, for later use.

Figure 6A:
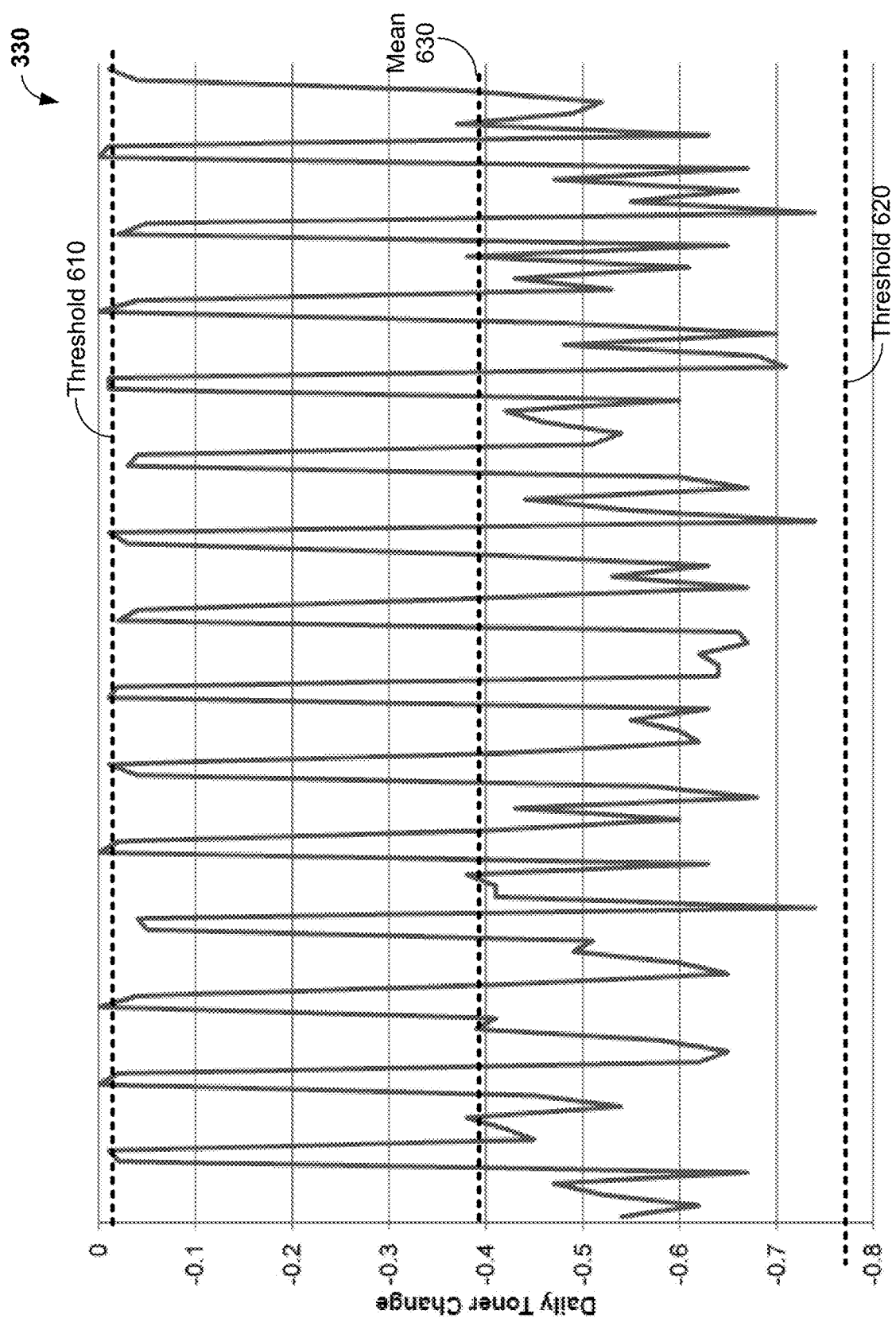
FIG. 6A shows a graph of daily changes in toner values for an example printing device, and corresponding threshold values according to an example embodiment.

FIG. 6A shows a graph of daily changes in toner values for an example printing device, and corresponding threshold values according to an example embodiment. In example shown in FIG. 6A, the threshold values 610, 620 are determined based on Equation (1):

$$\text{Threshold}=\text{mean}\pm\text{constant}*\text{standard\_deviation}, \quad (1)$$

where mean is the mean value of the differences between colorant-usage values shown in FIGS. 5 and 6A and is shown as mean 630 in FIG. 6A, constant is a pre-determined or constant value, and standard_deviation is the standard deviation of differences between colorant-usage values shown in FIGS. 5 and 6A. For the specific values shown in FIG. 6A, mean=−0.3958, constant=1.5, and standard_deviation=0.2541. Using Equation (1), colorant-value upper-bound threshold 610 can be determined as −0.3958+1.5*0.2541=−0.0147, and lower-bound threshold 620 is determined as −0.3958−1.5*0.2541=−0.7769.

Continuing this example, colorant-usage prediction software 216 can filter out all values that are not between upper-bound threshold 610 and lower-bound threshold 620; that is, for the example of FIG. 6A, all daily changes in toner values not in the range [−0.7769, −0.0147] can be filtered out. Other values of the constant in Equation (1), such constant=0.5, 0.75, 1, 1.25, 2, 2.5, 3, etc. and/or other techniques for determining thresholds are possible as well.

In some embodiments, the differences between colorant-usage values can be considered as a colorant-usage rate, such as a daily (or other periodic) colorant-usage rate. Then, colorant-usage prediction software 216 can compare the colorant-usage rate to one or more values representing a distribution of colorant-usage rate values, such as the expected value (or values) of colorant usage discussed in the context of block 320. Then, colorant-usage prediction software 216 can determine whether the colorant-usage rate is within a distribution of (daily) colorant-usage rate values.

If colorant-usage prediction software 216 determines that the colorant-usage rate is not within the distribution of colorant-usage rate values, then the colorant-usage prediction software 216 can filter out the colorant-usage rate. However, if colorant-usage prediction software 216 determines that the colorant-usage rate is within the distribution of colorant-usage rate values, then the colorant-usage prediction software 216 can filter in the colorant-usage rate for later use; e.g., to use the colorant-usage rate to determine linear, non-linear/prediction, and/or other prediction components based on this comparison.

In particular embodiments, the distribution of colorant-usage rate values can be based on one or more colorant-level values and one or more number-of-pages values. For example, if the differences between colorant-usage values are daily (or other periodic) colorant-usage rates, then the daily colorant-usage rates can be divided by the number of pages printed on that day (or other period of time) to determine a daily (or other periodic) colorant-usage rate per page. This daily (or other periodic) colorant-usage rate per page can be compared to one or more values representing the distribution of colorant-usage rate values. For example, the expected value (or values) of colorant usage discussed in the context of block 320 can be divided by an expected value (or values) of a number of pages to be printed per day (or other period of time) to determine an expected colorant-usage rate per page. Then, the daily (or other periodic) colorant-usage rate per page can be compared to the expected colorant-usage rate per page either to determine that the daily (or other periodic) colorant-usage rate per page is within the distribution of colorant-usage rate values and be filtered in for later use or to determine that the daily (or other periodic) colorant-usage rate per page is outside the distribution of colorant-usage rate values and be filtered out for later use. Other techniques for filtering relative historical information are possible as well.

Figure 6B:
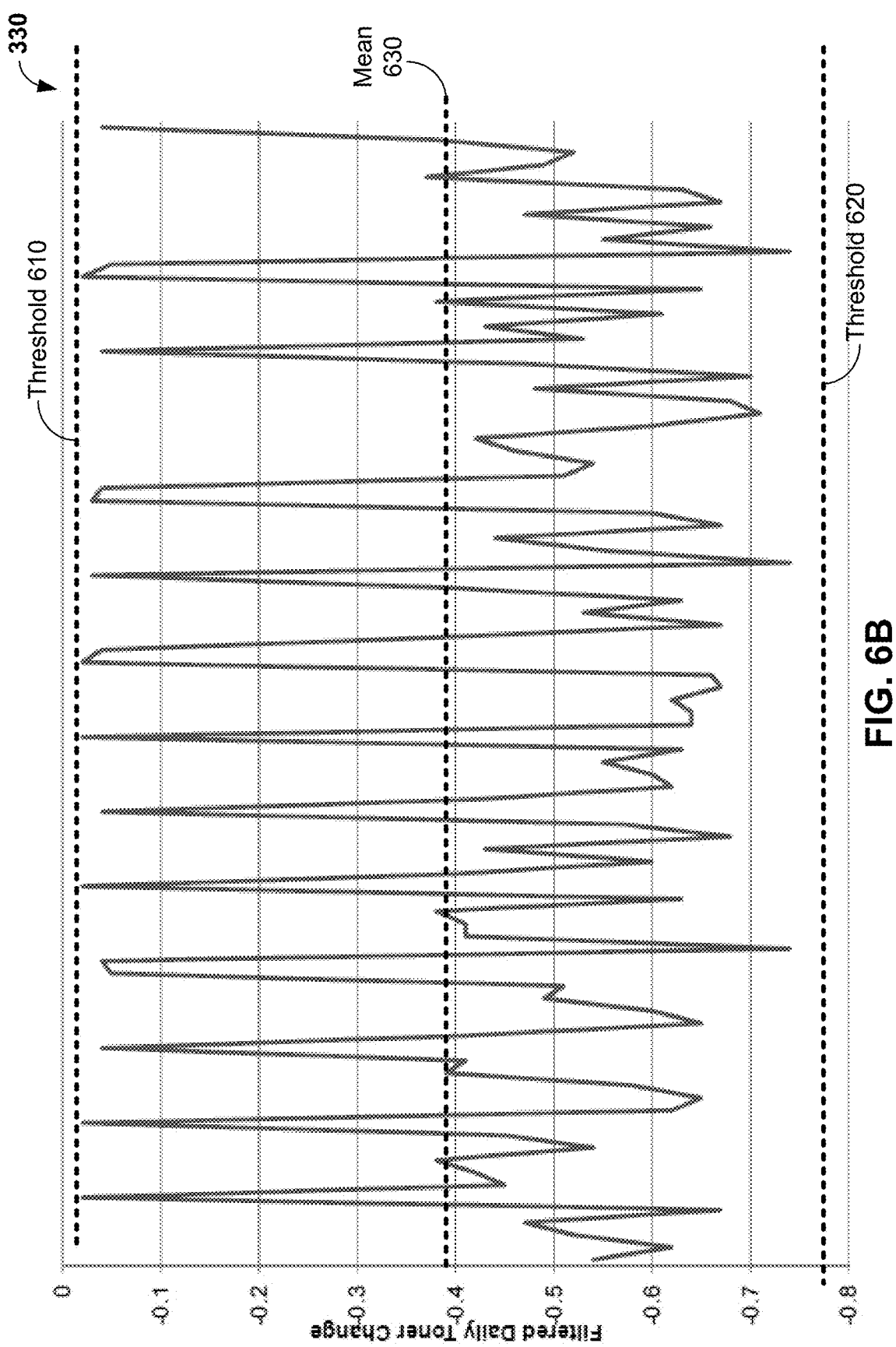
FIG. 6B shows a graph of filtered daily changes in toner values for an example printing device, according to an example embodiment.

FIG. 6B shows a graph of filtered daily changes in toner values for an example printing device, according to an example embodiment. In the example shown in FIG. 6B, relative historical information, represented as differences in toner usage values provided by PD1, has been filtered so that all values that are not between upper-bound threshold 610 and lower-bound threshold 620 have been excluded.

Returning to FIG. 3, at block 333, colorant-usage prediction software 216 can determine whether updated prediction components are available. The updated prediction components can include, but are not limited to, linear prediction components and/or non-linear prediction components, where the non-linear prediction components can include periodic prediction components.

In some embodiments, colorant-usage prediction software 216 can itself generate and/or update the prediction component(s) by operating on component-related data, such as, but not limited to, the printer data of block 310, the historical information of block 320, and/or the filtered and/or normalized historical information of block 330. In other embodiments, colorant-usage prediction software 216 can determine whether the updated prediction components are available from an external source; e.g., a machine learning server (or servers) such as machine learning server(s) 132 operating on the component-related data, such as, but not limited to, the printer data of block 310, the historical information of block 320, and/or the filtered and/or normalized historical information of block 330.

If updated prediction components are available to colorant-usage prediction software 216, then method 300 can proceed to block 336. Otherwise, updated prediction components are not available to colorant-usage prediction software 216, and method 300 can proceed to block 340.

At block 336, colorant-usage prediction software 216 can obtain, load, and/or use, the available updated prediction components.

At block 340, colorant-usage prediction software 216 can determine linear prediction component(s) for at least printing device PD1. Colorant-usage prediction software 216 can determine the linear prediction component(s) either by generating and/or updating linear prediction component(s) itself or by obtaining the linear prediction component(s) from an external source, such as discussed above in the context of block 333.

Linear prediction component(s) can be generated by applying one or more regression techniques to the component-related data, such as a linear regression technique; e.g., least-squares regression, maximum-likelihood regression. The linear prediction component(s) can be updated based on additional component-related data and/or based on other criteria; e.g., each time colorant is replaced in printing device PD1. Equation (2) expresses an example linear prediction component:

$$\text{colorant} = \text{constant1} + \text{colorant\_change} * \text{number\_of\_periods} + \text{error\_term} \quad (2)$$

where colorant represents a colorant usage value, such as the daily toner values shown in FIG. 4A or weekly toner values shown in FIG. 4B, constant1 is a predetermined value representing an x-intercept value for Equation (2), colorant_change is a predetermined value representing a rate of change per time period for colorant values, number_of_periods is a variable value representing a number of time periods, and error_term is a predetermined value representing statistical error in the linear prediction component. In some embodiments, a mean or other value determined from filtered or unfiltered relative historical information can be used to determine the linear prediction component; e.g., a mean filtered colorant change value can be used as a colorant_change value in Equation (2).

Figure 6C:
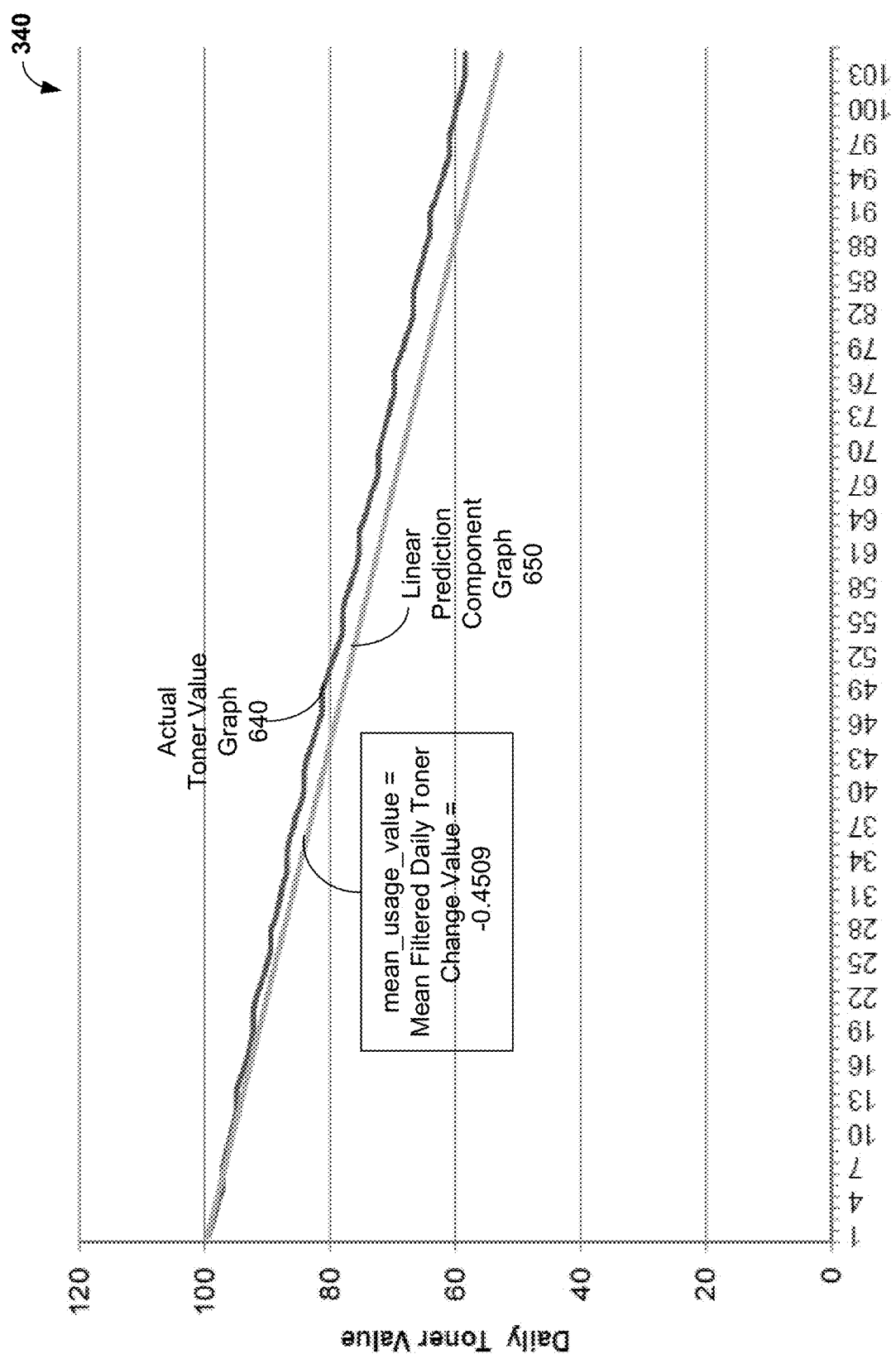
FIG. 6C shows graphs of daily toner values for an example printing device and a corresponding linear prediction component of toner values, according to an example embodiment.

FIG. 6C shows actual toner graph 640 of daily toner values for PD1 and a corresponding linear prediction component graph 650 of a linear prediction component for predicting toner values for PD1, according to an example embodiment. Actual toner graph 640 shows filtered daily toner values provided by PD1, where the daily toner values were filtered based on the thresholds of FIGS. 6A and 6B and discussed above in the context of block 330. Linear prediction component graph 650 graphs a linear prediction component, where the linear prediction component is expressed using Equation (3):

$$\text{toner\_value} = \text{mean\_usage\_value} * \text{number\_of\_periods} + \text{error\_term} \quad (3)$$

Equation (3) is Equation (2) where: constant1 and error_term of Equation (2) are set to 0 and where colorant_change of Equation (2) equals mean_usage_value of Equation (3). The mean_usage_value can be the mean of the filtered daily toner change values shown in graph 630. In the particular example shown in FIG. 6C, mean_usage_value=−0.4509.

In other embodiments, the linear prediction component can be expressed using Equation (4):

$$\text{toner\_value} = (\text{mean\_usage\_value} - K * SD) * \text{number\_of\_periods} + \text{error\_term} \quad (4)$$

where:
toner_value, mean_usage_value, number_of_periods, and error_term are as discussed above for Equation (3),
K is a constant value, such as −1, −0.5, +0.5, +1, and
SD is a standard deviation of usage levels.

A linear prediction component based on Equation (4) can determine the predicted colorant level (toner_value) based on an adjusted mean_usage_value, where the adjusted mean_usage_value can be adjusted based on a scaled value of the standard deviation of usage values. Thus the adjusted mean_usage_value, expressed as (mean_usage_value−K*SD) in Equation (4), either can be above or below an actual usage value, depending on the value of K.

In some scenarios, business situations may indicate that printing device downtime due to running out of colorant is to be minimized or avoided. In these scenarios, smaller and/or negative values of K; e.g., −0.5 or −1, can be used to increase the likelihood that the predicted toner_value of Equation (4) is below what is the actual colorant level. For example, suppose replacement colorant is ordered at a time based on predicted colorant values, such as the toner_value of Equation (4); e.g., replacement colorant is ordered if toner_value is less than 25%. Choosing a small or negative value of K in Equation (4) can cause lower predicted colorant levels lower than actually observed, and so cause replacement colorant to be ordered earlier than needed. Early ordering of colorant can ensure colorant is available before printer downtime is incurred.

Returning to FIG. 3, at block 350, colorant-usage prediction software 216 can determine non-linear prediction component(s), such as periodic prediction component(s), for at least printing device PD1. Colorant-usage prediction software 216 can determine the non-linear and/or periodic prediction component(s) either by generating and/or updating the non-linear and/or periodic prediction component(s) itself or by obtaining the non-linear and/or periodic prediction component(s) from an external source, such as discussed above in the context of block 333.

For example, periodic, non-linear prediction components can be estimated using Fourier regression techniques. Fourier regression includes estimating or modeling a linear or non-linear function as a function of sine and cosine functions. Let F(T) be the function to be estimated. Then, Equation (5) expresses a Fourier regression model for estimating F(T):

$$F(T) = \frac{a_0}{2} + \sum_{n=1}^{k} [a_n \cos(nt) + b_n \sin(nt)] \quad (5)$$

where k is a pre-determined integer greater than or equal to 0; and $a_0, a_1 \ldots a_n$ and $b_1, b_2 \ldots b_n$ are constant values.

For example, a first periodic function can be determined based on differences between actual daily toner usages and a predicted daily toner usage produced by a linear function. For example, suppose the actual daily toner usage values for a work week were ADTU={−0.5%, −0.3%, −0.7%, −0.6%, −0.5%} and the linear function predicting daily toner usage was Predicted_daily_toner_usage=−0.5%. Then, the differences between ADTU and Predicted_daily_toner_usage equal: DATDU=ATDU−Predicted_daily_toner_usage={0.0%, +0.2%, −0.2%, −0.1%, 0.0%}). Then, the first periodic function can be determined based on the DATDU values. A second periodic function can be modelled based on the difference between actual daily toner usages (e.g., the ADTU values) and combined values of linear and first periodic function. Additional periodic functions can be generated in using similar techniques.

In some embodiments, F(T) in Equation (5) can be a colorant-usage function that represents colorant usage by a printing device, such as PD1, over time; e.g., F(T) represents colorant usage by PD1 (or other printing device(s)) measured on a daily, weekly, monthly, yearly, or on some other time-related basis. Then, the value nt in Equation (5) can represent an amount of time where colorant is used, where n represents a fractional or integer number of days. For example, let F(T) represents weekly colorant usage by PD1, let t represent time in days, and let k=4. Then, F(T) can be approximated using Equation (5) as F(T)≈$a_0$+$a_1$ cos(t)+$b_1$ sin(t)+ . . . +$a_4$ cos(4t)+$b_4$ sin(4t).

That is, the weekly colorant usage by PD1 represented by F(T) can be approximated by a sum of daily periodic colorant usage functions; e.g., the sin(nt) and cos(nt) functions. The value of t can vary based on the amount of time between measurements; for examples, if the value of T represents time measured in days, then example values of t can be determined as: t=T for daily measurements, t=(2/7)*π*T for weekly measurements, t=(2/30.4375)*π*T for monthly measurements, and t=(2/365.25)*π*T for yearly measurements.

For example, Equation (5a) expresses the Fourier regression model provided by Equation (5) for estimating F(T) where T represents time in days, and where the measurements used to determine the Fourier regression model are measured monthly:

$$F(T) = \frac{a_0}{2} + \sum_{n=1}^{k} \left[ a_n \cos\left(\frac{2\pi}{30.4375}nT\right) + b_n \sin\left(\frac{2\pi}{30.4375}nT\right) \right] \quad (5a)$$

In some embodiments, Equation (5) can then be used to model daily, weekly, monthly, or other colorant-usage functions as a sum of sine and cosine functions. The $a_n$ and $b_n$ values of Equation (5) can be determined using a Fourier transform, one or more linear regressions, and/or related functionality such as the Fast Fourier Transform (FFT). Other techniques for modeling colorant-usage functions using linear and non-linear prediction components are possible as well.

Printer data values for a relatively-short period of measurement can be used to determine prediction components for a relatively-long period of measurement. For example, filtered (or unfiltered) daily (filtered) colorant-usage values such as generated at block 330 can be used to generate a weekly periodic prediction component, weekly colorant-usage values can be used to generate a monthly periodic prediction component, monthly colorant-usage values can be used to generate a yearly periodic prediction component, and so on. For example, daily (or weekly or monthly) colorant-usage values, such as filtered daily (or weekly or monthly) toner change values, can be used to generate a weekly (or monthly or yearly) periodic component indicating actual printer usage on a weekly (or monthly or yearly) basis. Then, the weekly (or monthly or yearly) periodic component can be estimated using regression techniques, such as discussed above in the context of block 340 and block 350 (this block) of method 300.

Figure 7A:
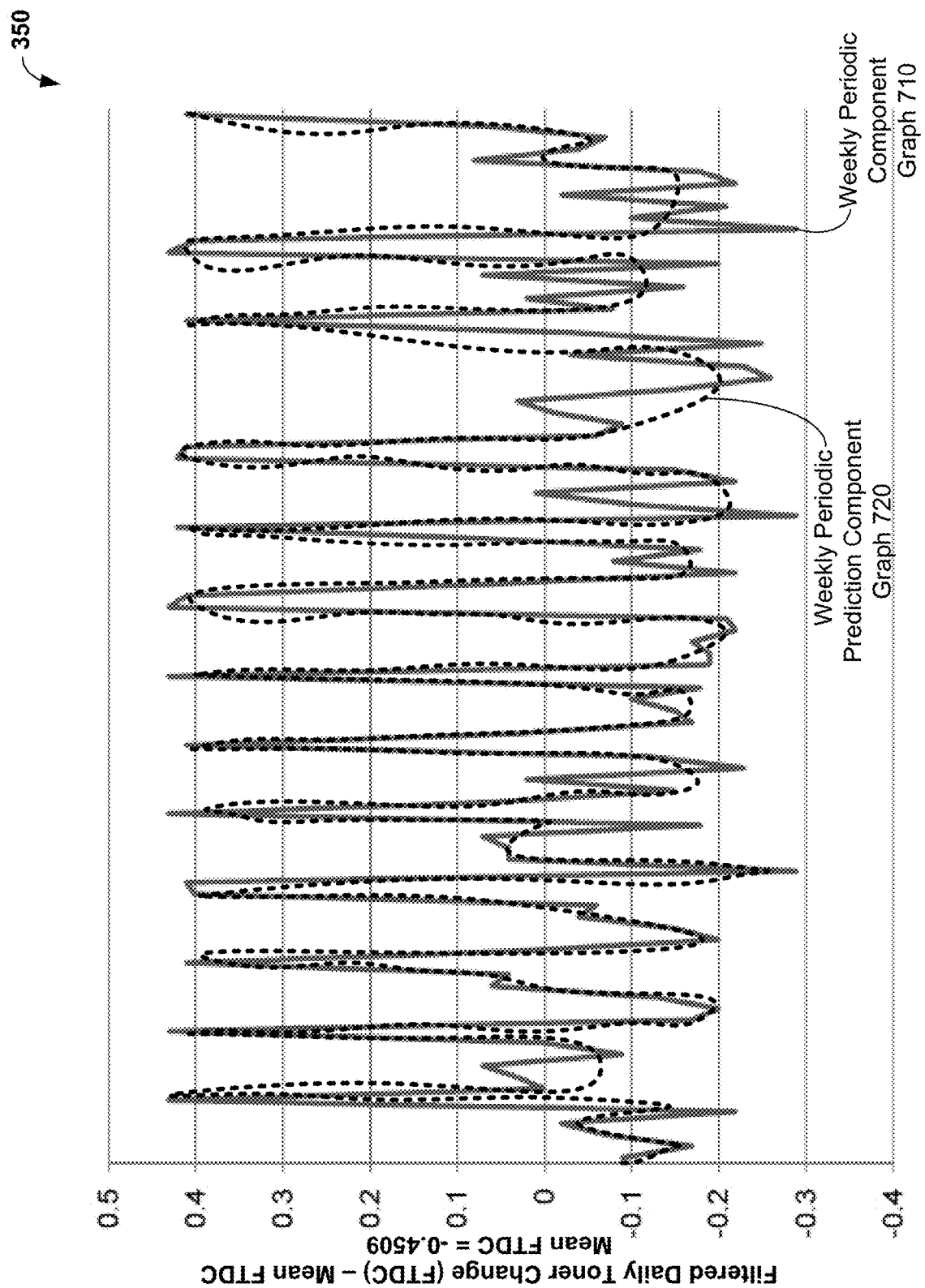
FIG. 7A shows a weekly periodic component graph of toner values for an example printing device and a corresponding weekly periodic prediction component graph, according to an example embodiment.

FIG. 7A shows weekly periodic component graph 710 of toner values for printing device PD1 and a corresponding weekly periodic prediction component graph 720, according to an example embodiment. A weekly periodic component can be determined using daily colorant usage values for PD1, as indicated on the left of FIG. 7A. In particular, a weekly periodic component can be generated using filtered daily toner change values, and the weekly periodic component can be graphed as graph 710. Filtered daily toner change values are also shown in FIG. 6B and discussed above in the context of block 330. FIG. 7A shows that weekly periodic component graph 710 is a graph of filtered daily toner change values that have been normalized to show differences about a mean filtered daily toner change value by taking the difference of each filtered daily toner change value and the mean filtered daily toner change value. That is, weekly periodic component graph 710 indicates how much toner change varies from the mean value over time on a daily basis, further indicating how much toner changes on a weekly basis.

A weekly periodic prediction component can be determined as discussed above in the context of this block. For example, the weekly periodic component graphed as graph 710 can be used as F(T) in Equation (5) and Fourier regression techniques can be used to determine the weekly periodic prediction component shown on the right-hand side of Equation (5). Then, the weekly periodic prediction component can be graphed to generate graph 720.

Figure 7B:
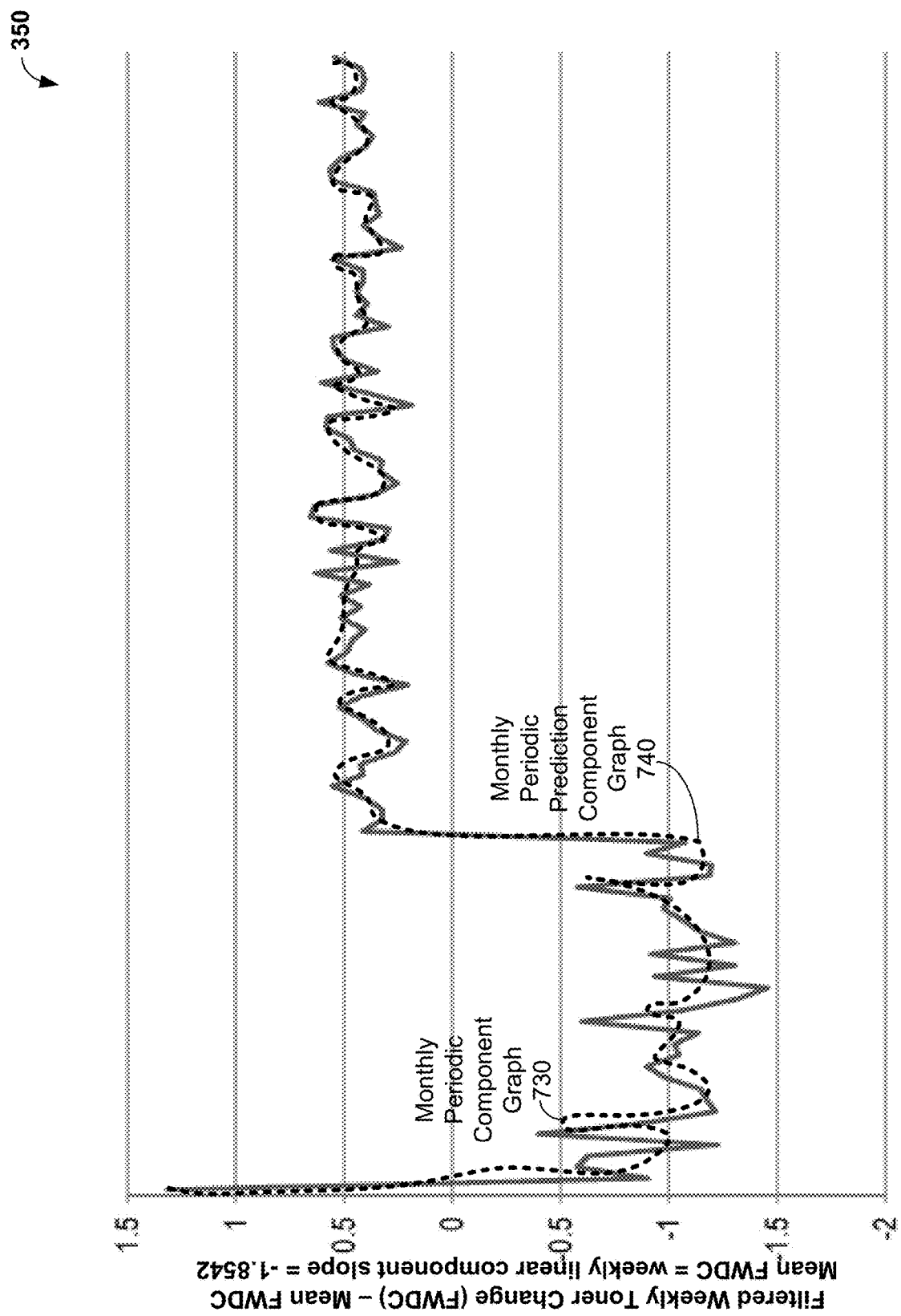
FIG. 7B shows a monthly periodic component graph of toner values for an example printing device and a corresponding monthly periodic prediction component graph, according to an example embodiment.

FIG. 7B shows a monthly periodic component graph 730 of toner values for an example printing device and a corresponding monthly periodic prediction component graph 740, according to an example embodiment. A monthly periodic component can be determined using weekly colorant usage values for PD1, as indicated on the left of FIG. 7B. In particular, a monthly periodic component can be generated using filtered weekly toner change values, and the monthly periodic component can be graphed as graph 730. FIG. 7B shows that monthly periodic component graph 730 is a graph of filtered weekly toner change values that have been normalized to show differences about a mean filtered weekly toner change value by taking the difference of each filtered weekly toner change value and the mean filtered weekly toner change value. That is, monthly periodic component graph 730 indicates how much toner change varies from the mean value over time on a weekly basis, further indicating how much toner changes on a monthly basis.

A monthly periodic prediction component can be determined as discussed above in the context of this block. For example, the monthly periodic component graphed as graph 730 can be used as F(T) in Equation (5) and Fourier regression techniques can be used to determine the monthly periodic prediction component shown on the right-hand side of Equation (5). Then, the monthly periodic prediction component can be graphed to generate graph 740.

Figure 7C:
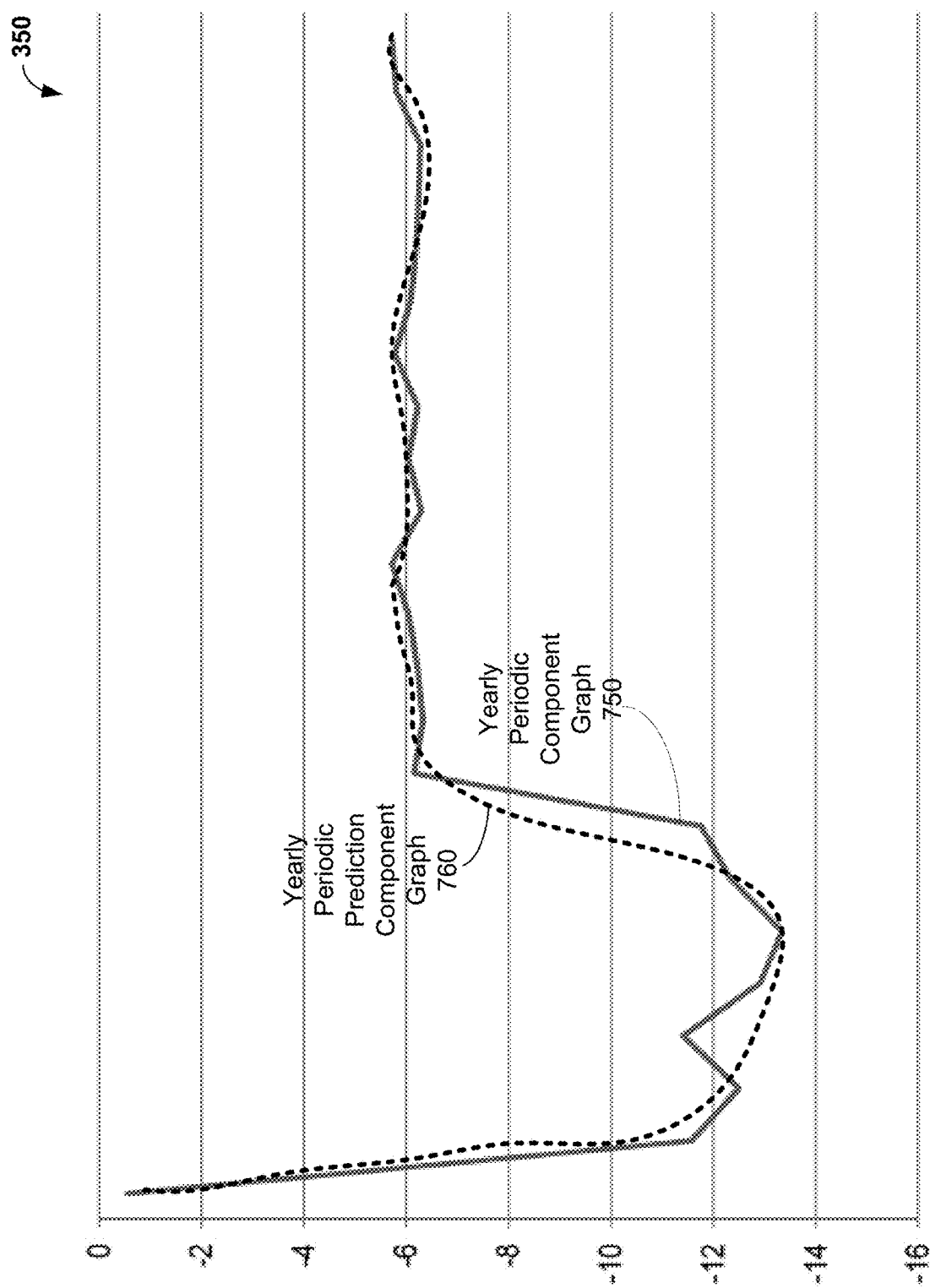
FIG. 7C shows a yearly periodic component graph of toner values for an example printing device and a corresponding yearly periodic prediction component graph, according to an example embodiment.

FIG. 7C shows a yearly periodic component graph 750 of toner values for an example printing device and a corresponding yearly periodic prediction component graph 760, according to an example embodiment.

A yearly periodic component can be determined using monthly colorant usage values for PD1, as indicated on the left of FIG. 7C. In particular, a yearly periodic component can be generated using filtered monthly toner change values, and the yearly periodic component can be graphed as graph 750. FIG. 7B shows that yearly periodic component graph 750 is a graph of filtered monthly toner change values that have been normalized to show differences about a mean filtered monthly toner change value by taking the difference of each filtered monthly toner change value and the mean filtered monthly toner change value. That is, yearly periodic component graph 730 indicates how much toner change varies from the mean value over time on a monthly basis, further indicating how much toner changes on a yearly basis.

A yearly periodic prediction component can be determined as discussed above in the context of this block. For example, the yearly periodic component graphed as graph 750 can be used as F(T) in Equation (5) and Fourier regression techniques can be used to determine the yearly periodic prediction component shown on the right-hand side of Equation (5). Then, the yearly periodic prediction component can be graphed to generate graph 760.

In some embodiments, weekly, monthly, and/or yearly periodic components and/or weekly, monthly, and/or yearly periodic prediction components can be determined using data obtained at different intervals than shown in FIGS. 7A-7C. For example, monthly and/or yearly components can be determined based on daily colorant usage values. Many other examples are possible as well.

At block 360, colorant-usage prediction software 216 can determine additional prediction component(s) from filtered/normalized historical information for at least PD1. Examples of these additional prediction components can include, but are not limited to, a wear-off prediction component and a colorant capacity prediction component. The wear-off prediction component can model effects on colorant usage based on maintenance events, such as fuser changes for laser printing devices or nozzle changes for inkjet or other ink-based printing devices. The colorant capacity component can model effects on colorant usage based on changes in stored colorant; e.g., toner cartridge changes, ink refills, etc.

Figure 8:
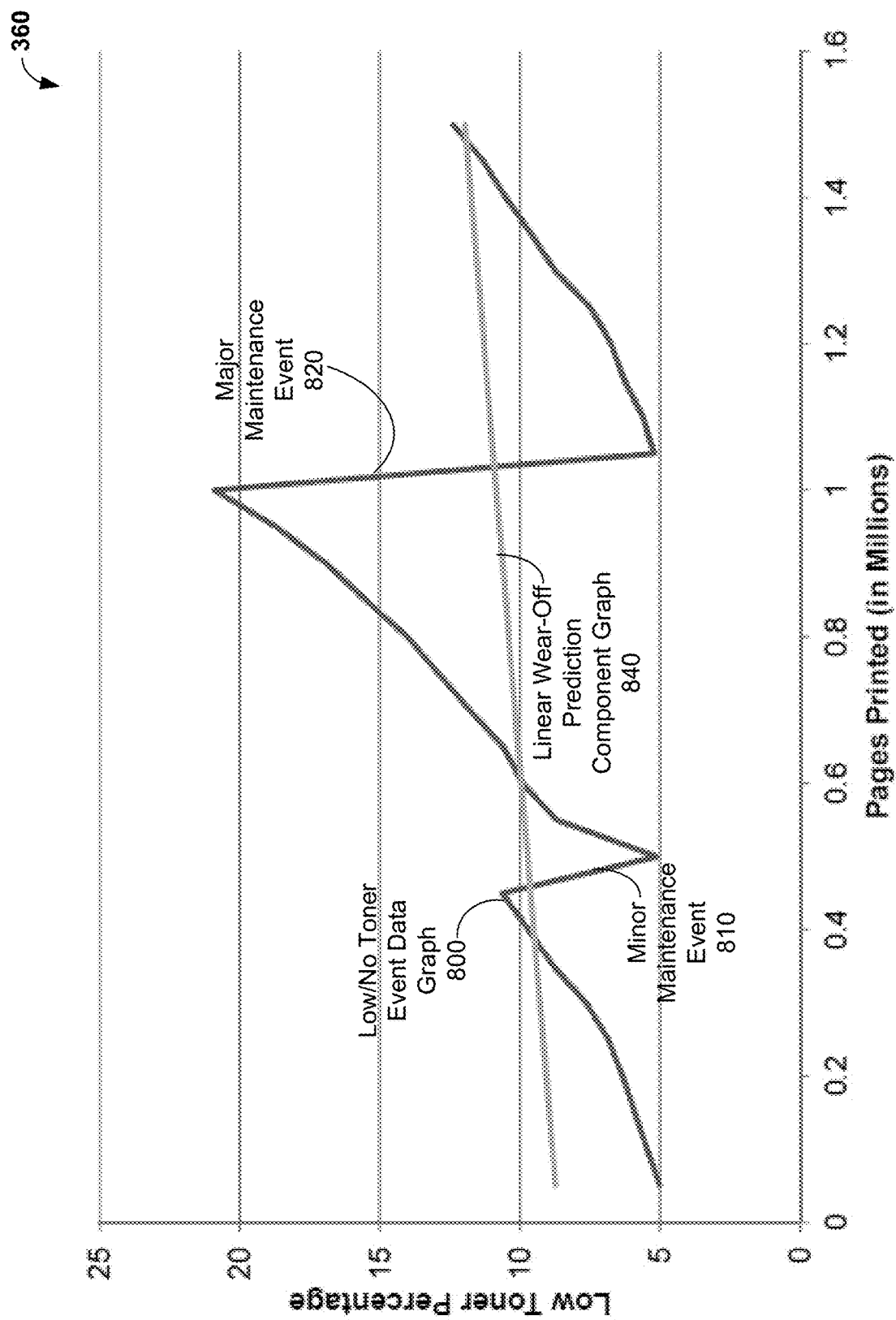
FIG. 8 shows a graph of a low toner percentage values for an example printing device and a graph of a corresponding linear wear-off prediction component, according to an example embodiment.

FIG. 8 shows a graph 800 of a low toner percentage values for an example printing device and a corresponding linear wear-off prediction component graph 840, according to an example embodiment. For some printing devices, colorant usage levels change based on maintenance events for the printing device.

Some printing devices trigger a "low toner" event at a predetermined percentage of available toner for the printer device; e.g., 5%, 10%, and/or trigger a "no toner" event when no (0%) of toner is available to the printing device. As the printing device is used, the printing device can have a reduced ability to detect an amount of remaining toner, and so low toner events can be triggered at a higher than the predetermined percentage of available toner; e.g., if the original predetermined percentage was 5%, then an often-used printer can trigger low toner events when 6% or 7% of toner is available to the often-used printer. Thus, over time, more toner can be available to a printing device after an initial low toner event.

Additionally, some printing devices only have functionality, such as toner sensor(s), to estimate three toner statuses: a no toner status, a low toner status, and a regular status. In some embodiments, the printing device has only one toner sensor to detect a low toner status. In these embodiments, a no toner status can be determined after a predetermined number of pages is printed using at or below predetermined toner coverage percentage. For example, a no toner status is received when at least 100 pages are printed with 5% or less toner coverage. For these printing devices, no toner events, and perhaps other events, can be determined based on calculations/estimates using readings from the low-toner sensor. Then, the reduced ability to detect an amount of remaining toner over time can cause the printing device to send low toner events and no toner events earlier than necessary, thereby wasting toner.

Graph 800 shows the effects on low toner percentage values based on maintenance events. For example, a printing device can have minor and major maintenance events. FIG. 8 shows, for example, minor maintenance event 810 occurring after printing approximately 450,000 pages and major maintenance event 820 occurring after printing approximately 1,000,000 pages. After these maintenance events, low toner percentage values have an immediate drop and then gradually rise until the next maintenance event as illustrated by graph 800 of FIG. 8.

Linear and/or non-linear regression techniques can be applied to low toner percentage values; such as the values graphed by low/no toner event data graph 800. For example, a linear regression technique can be applied to the low/no toner event data shown in graph 800 to generate a linear prediction component modeling effects of wear on toner usage, such as a linear wear-off prediction component graphed as linear wear-off prediction component graph 840. Other techniques can be used to model wear-off and so generate wear-off prediction components; e.g., other linear techniques, non-linear and/or periodic techniques.

Figure 9:
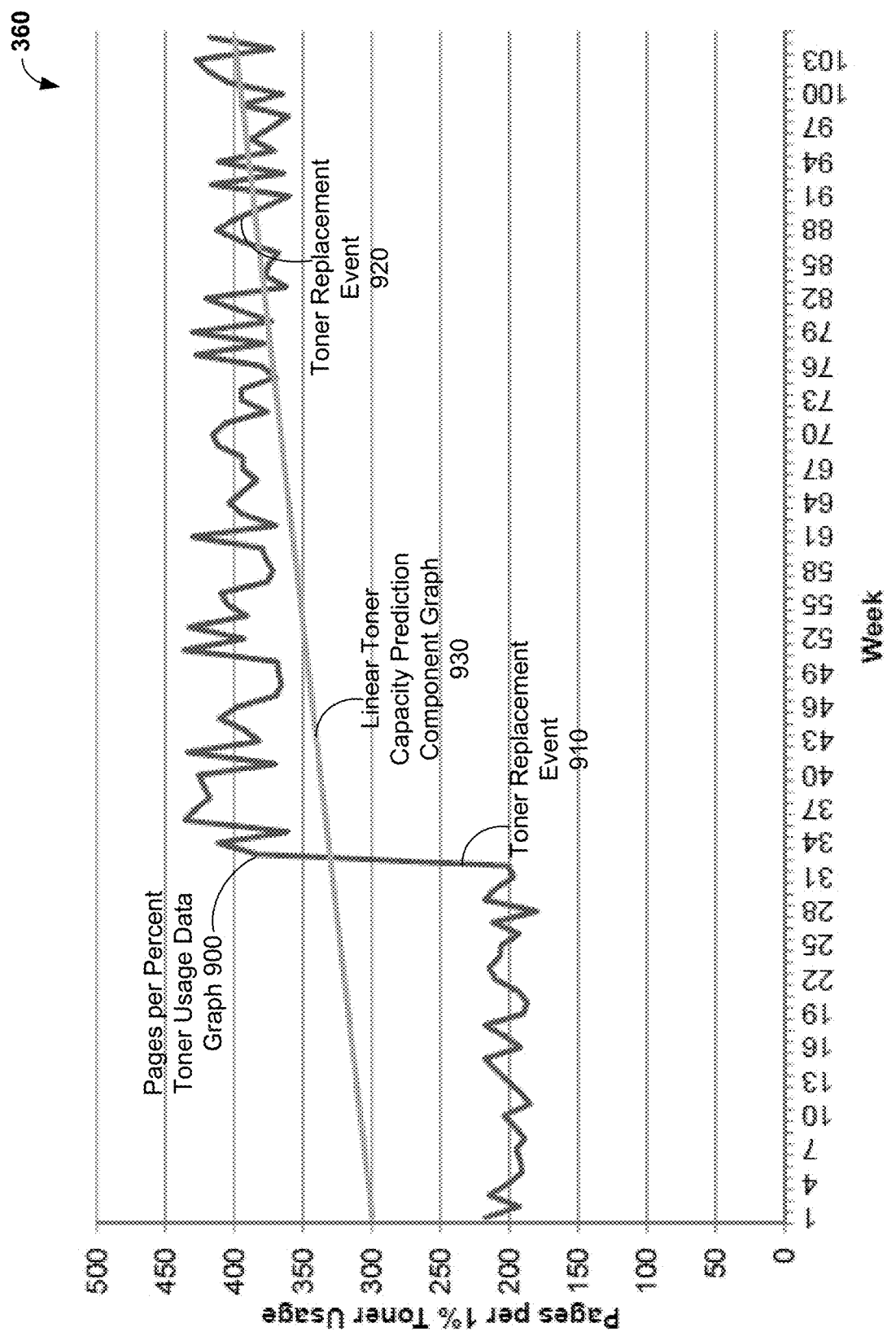
FIG. 9 shows a graph of a number of pages printed per percentage of toner usage by an example printing device and a graph of corresponding linear toner capacity prediction component, according to an example embodiment.

FIG. 9 shows graph 900 of a number of pages printed per percentage of toner usage by an example printing device and graph 930 of a corresponding linear toner capacity estimate, according to an example embodiment. Graph 900 shows a number of pages per 1% of toner used by an example printing device. During the time indicated by graph 900, the printing device has had the toner cartridge changed twice—these toner replacement events are indicated in graph 900 as toner replacement events 910, 920. After toner replacement event 910, the amount of number of pages per 1% of toner used increased substantially, likely indicating that the replacement toner cartridge has a higher toner capacity, and thus allows for more pages to be printed per 1% of toner used, than the initial toner cartridge used by the printing device. Toner replacement event 920 does not correspond to a significant change in the number of pages to be printed per 1% of toner used, likely indicating that the second replacement toner cartridge has about or exactly the same toner capacity as the first (previous) replacement toner cartridge. As such, colorant capacity, such as toner capacity or ink capacity, can have an effect on the amount of time between changes of colorant.

Linear and/or non-linear regression techniques can be applied to number of pages to be printed per 1% of toner (or other colorant) used values, such as the values graphed by number of pages printed per percentage of toner usage graph 900. For example, a linear regression technique can be applied to the number of pages to be printed per 1% of toner (or other colorant) used data shown in graph 900 to generate a linear prediction component modeling effects of toner (or other colorant) capacity, such as a linear toner capacity prediction component graphed as linear toner capacity prediction component graph 930. Other techniques can be used to model wear-off and so generate toner (or other colorant) colorant prediction components; e.g., other linear techniques, non-linear and/or periodic techniques.

Returning to FIG. 3, at block 370, colorant-usage prediction software 216 can combine prediction components for devices co-located with PD1 and/or devices similar to PD1 with prediction components for PD1; e.g., the linear prediction components for PD1 of block 340 and/or the periodic prediction components for PD1 of block 350. For example, the prediction components for devices co-located with PD1 and/or devices similar to PD1 can be averaged with the prediction components of PD1. Then, these averaged, or otherwise mathematically combined, prediction components can be used to predict colorant replacement for PD1 and/or other printing devices and/or to provide confidence interval values for predictions of colorant replacement for PD1 and/or other printing devices.

In particular, linear and non-linear/periodic prediction components can be combined to estimate colorant usage for a printing device, such as PD1. For example, Equations (3) and (5) can be combined to determine an estimated colorant usage Est for the printing device, as expressed in Equation (6) below:

$$\begin{aligned}Est = {} & w1*(\text{linear component}) + w2*(\text{non-linear component}) \quad (6) \\ = {} & w1*(\text{mean\_usage\_value}*\text{number\_of\_periods}* \\ & \text{error\_term}) + w2* \\ & \left\{ \frac{a_0}{2} + \sum_{n=1}^{k} [a_n \cos(nt) + b_n \sin(nt)] \right\}\end{aligned}$$

where w1 and w2 are weighting values; e.g., if w1>w2, then the linear prediction component can be considered to be weighted more than the non-linear component, if w1<w2, then the non-linear prediction component can be considered to be weighted more than the linear prediction component, and if w1=w2 then the linear and non-linear prediction components can be considered to have equal weight. In particular, if w1=w2=1, then the estimate of colorant usage Est provided by Equation (6) equals the sum of the linear and non-linear prediction components.

In some embodiments, the linear prediction component of Equation (4), or some other linear prediction component, can be used to determine Equation (6). In other embodiments, a different non-linear prediction component than shown as Equation (5) can be used in Equation (6).

In still other embodiments, colorant-usage prediction software 216 can combine prediction components with additional prediction components, such as, but not limited to, the additional prediction components determined at block 360, e.g., components related to wear-off and toner capacity. Other techniques for determining linear, non-linear, periodic and other prediction components are possible as well. Further, other techniques for determining estimates of colorant usage using and/or mathematically combining linear, non-linear, periodic/or and other prediction components are possible as well.

At block 380, colorant-usage prediction software 216 can use a colorant replacement prediction algorithm to predict colorant replacement for at least PD1 utilizing linear, periodic and/or additional prediction components. Example colorant replacement prediction algorithms are shown as respective methods 1000 and 1030 and discussed immediately below in the respective contexts of FIG. 10A and FIGS. 10B-10C. Other colorant replacement prediction algorithms are possible as well. Upon completion of block 380, method 300 can be completed.

FIG. 10A shows a flowchart illustrating method 1000 for a colorant replacement prediction algorithm, according to an example embodiment. The colorant replacement prediction algorithm can be used by colorant-usage prediction software 216 and/or prediction server(s) 130 to predict when colorant is to be replaced for a printing device PD1.

Method 1000 can begin at block 1010, where colorant-usage prediction software 216 can obtain printer information related to PD1, such as, but not limited to, device information, colorant-usage information for PD1, and maintenance-event information for PD1. As mentioned above, device information can include manufacturer-supplied data about PD1 such as PD1's manufacturer name, PD1's model name, product specification data about PD1, dictionary data about PD1, and/or other device characteristics about PD1 and related devices. Colorant-usage information for PD1 can include PD1's toner level information or ink level data.

Maintenance-event information for PD1 can include information about colorant-related maintenance for PD1; e.g., toner cartridge replacement event information, ink replacement event information, fuser replacement event information, nozzle replacement event information, etc.

At block 1012, colorant-usage prediction software 216 can generate general initial prediction components such as one or more linear, periodic, non-linear, and/or additional prediction components, for estimating colorant usage by PD1 and perhaps accounting for wear-off and/or colorant capacity for estimating PD1's colorant usage, based on the device information. Generation of linear and non-linear/periodic prediction components are discussed above in more detail at least in the context of blocks 340 and 350 of FIG. 3 and FIGS. 6C-7C. Wear-off and colorant capacity prediction components are discussed above in more detail at least in the context of block 360 of FIG. 3 and FIGS. 8 and 9.

For example, suppose PD1 uses toner as a colorant, PD1 currently has 50% of toner remaining, and the device information includes manufacturer-supplied data on recommended monthly printing volume for PD1 and similar devices of 3000 pages, and an initial toner capacity of 3000 pages. Colorant-usage prediction software 216 can generate general initial prediction components based on the device information. And, for this particular example, colorant-usage prediction software 216 can use the general initial prediction components to predict that toner for PD1 will last 15 days.

At block 1014, colorant-usage prediction software 216 can obtain available historical information AHD for printing devices related to PD1. Examples of printing devices related to PD1 include, but are not limited to, printing devices that are co-located with PD1, printing devices that are owned by and/or used by the same entity that owns and/or uses PD1, and/or printing devices that have the same, or similar, manufacturer, model, and/or other device characteristics as PD1.

In some embodiments, available historical data AHD can be generated by aggregating printer data provided by the printing devices related to PD1. In some embodiments, the printing devices related to PD1 can provide printer data; e.g., device information, colorant-usage information, and/or maintenance-event information, to one or more other devices. These other device(s) can include, but are not limited to prediction server(s) 130, machine learning server(s) 132, and/or product information server(s)/database(s) 134. In particular embodiments, the printing devices related to PD1 can provide the printer data on a periodic basis (e.g., hourly, daily, weekly, monthly, yearly), upon request by the other devices, upon detection of a change in some or all of the printer data, or upon some other bases. In other embodiments, the other device(s) can connect to and obtain the printer data from the printing devices related to PD1.

In particular, the other device(s); e.g., prediction server(s) 130, can obtain current usage data, such as usage data and colorant-usage information, on a periodic or other basis, from the printing devices related to PD1. Then, the other device(s) can determine available historical data AHD based on the current usage data. For example, the other device(s) can add the current usage data to already stored available historical data AHD. That is, available historical data AHD can be aggregated by the other device(s) by storing data obtained from the printing devices related to PD1 over time. Suppose that printing device PD2 is related to PD1, where PD2 was activated on day D2 and remained active for a number of days ND2, and where PD2 was configured to provide printer data, including current usage data on a daily basis to prediction server(s) 130. Then, prediction server(s) 130 can aggregate available historical data AHD about PD2 by storing and/or updating available historical data AHD so that AHD includes, but is not limited to, the current usage data provided by PD2 on day D2, day D2+1, ..., and day D2+ND2. Other techniques for obtaining, generating, and/or aggregating available historical data AHD are possible as well.

At block 1016, colorant-usage prediction software 216 can generate one or more related initial prediction components, such as one or more linear, periodic, non-linear, and/or additional prediction components, for estimating colorant usage by PD1 and perhaps accounting for wear-off and/or colorant capacity for estimating PD1's colorant usage. The related prediction components can be generated based on the available historical information AHD for printing devices related to PD1. Generation of linear and non-linear/periodic prediction components are discussed above in more detail at least in the context of blocks 340 and 350 of FIG. 3 and FIGS. 6C-7C. Wear-off and colorant capacity prediction components are discussed above in more detail at least in the context of block 360 of FIG. 3 and FIGS. 8 and 9.

Continuing the example above from block 1012, where the general initial prediction components predict that toner for PD1 will last 15 days, colorant-usage prediction software 216 can generate related initial prediction components based on available historical information AHD for printing devices related to PD1. And, for this particular example, colorant-usage prediction software 216 can use the related initial prediction components to predict that toner for PD1 will last 17 days, or two days longer than predicted by the general initial prediction components.

At block 1018, colorant-usage prediction software 216 can obtain PD1-specific data from printing device PD1. The PD1-specific data can include printer data about and/or from PD1; e.g., device information about and/or from PD1, colorant-usage information about and/or from PD1, and/or maintenance-event information about/from PD1.

In some embodiments, printing device PD1 can provide PD1-specific data to one or more other devices. These other device(s) can include, but are not limited to prediction server(s) 130, machine learning server(s) 132, and/or product information server(s)/database(s) 134. In particular embodiments, PD1 can provide PD1-specific data on a periodic basis (e.g., hourly, daily, weekly, monthly, yearly), upon request by the other devices, upon detection of a change in some or all of PD1-specific data, or upon some other bases. In other embodiments, the other device(s) can connect to and obtain the PD1-specific data from PD1.

In still other embodiments, some or all of the PD1-specific data can be aggregated into available historical data AHD. In particular, the other device(s); e.g., prediction server(s) 130, can obtain current PD1-specific data, such as usage data and colorant-usage information, on a periodic or other basis, from PD1 and perhaps additional devices. Then, the other device(s) can determine available historical data AHD based on the current usage data. For example, the other device(s) can add the current usage data to already stored available historical data AHD. That is, available historical data AHD can be aggregated by the other device(s) by storing data obtained from one or more printing devices, including PD1, over time. Suppose PD1 was activated on day D1 and remained active for a number of days ND and PD1 was configured to provide printer data, including current usage data on a daily basis to prediction server(s) 130. Then, prediction server(s) 130 can aggregate available historical data AHD about PD1 by storing and/or updating available historical data AHD so that AHD includes, but is not limited to, the current usage data provided by PD1 on day D1, day D1+1, ..., and day D+ND. Other techniques for obtaining, generating, and/or aggregating available historical data AHD are possible as well.

At block 1020, colorant-usage prediction software 216 can generate one or more specific initial prediction components, such as one or more linear, periodic, non-linear, and/or additional prediction components, for estimating colorant usage by PD1 and perhaps accounting for wear-off and/or colorant capacity for estimating PD1's colorant usage. The related prediction components can be generated based on the PD1-specific data. Generation of linear and non-linear/periodic prediction components are discussed above in more detail at least in the context of blocks 340 and 350 of FIG. 3 and FIGS. 6C-7C. Wear-off and colorant capacity prediction components are discussed above in more detail at least in the context of block 360 of FIG. 3 and FIGS. 8 and 9.

Continuing the example above from blocks 1012 and 1016, where the general initial prediction components predict that toner for PD1 will last 15 days, and that the related initial prediction components predict that toner for PD1 will last 17 days, colorant-usage prediction software 216 can generate specific initial prediction components based on PD1-specific data. And, for this particular example, colorant-usage prediction software 216 can use the specific initial prediction components to predict that toner for PD1 will last 20 days, or five days longer than predicted by the general initial prediction components, and three days longer than predicted by the related initial prediction components.

At block 1022, colorant-usage prediction software 216 can generate prediction components PC1 regarding colorant usage, PD1 wear-off and/or colorant capacity. The prediction components PC1 can include and/or otherwise be based on the general initial prediction components generated at block 1012, the related initial prediction components generated at block 1016, and/or the specific initial prediction components generated at block 1020. For example, prediction components PC1 can be an aggregation of the general, related, and specific initial prediction components. In some embodiments, the prediction components PC1 can be generated and/or updated based on the data collected at blocks 1010, 1014, and 1018; e.g., data used to generate the general, related, and/or specific initial prediction components. Generation of linear and non-linear/periodic prediction components from printer data is discussed above in more detail at least in the context of blocks 340 and 350 of FIG. 3 and FIGS. 6C-7C. Generation of prediction components related to wear-off and colorant capacity from printer data is discussed above in more detail at least in the context of block 360 of FIG. 3 and FIGS. 8 and 9.

At block 1024, colorant-usage prediction software 216 can receive a request to predict colorant usage for PD1. For example, the request to predict colorant usage can be a request to predict how long until colorant needs to be added to PD1, a request to predict when PD1 will be out of colorant, a request to predict when remaining colorant for PD1 will be at a certain percentage (e.g., a request to determine when PD1 will reach a 10%, 20%, 25%, 50%, or 80% level of remaining colorant), and/or another prediction related to PD1's colorant usage. In some embodiments, the request to predict colorant usage for PD1 can also include a request to provide confidence interval information related to prediction of colorant usage by PD1. In other embodiments, confidence interval information can be requested implicitly; that is, a request for a prediction of colorant usage by PD1 implicitly includes a request for confidence interval information related to the prediction of colorant usage by PD1.

At block 1026, colorant-usage prediction software 216 can, after receiving the request to predict colorant usage, determine an estimate U1 of PD1's colorant usage based on prediction components PC1 regarding colorant usage, wear-off and/or colorant capacity. U1, which is the estimate of PD1's colorant usage, can be one or more values for one or more predictions of: how long until colorant needs to be added to PD1, when PD1 will be out of colorant, when remaining colorant for PD1 will be at a certain percentage, and/or another prediction related to PD1's colorant usage as requested at block 1020. In some embodiments, U1 can include confidence interval information related to prediction of colorant usage by PD1, such as discussed above in the context of block 1020.

At block 1028, colorant-usage prediction software 216 can generate and send a response to the request to predict colorant usage received at block 1024. The response can include the estimate of colorant usage U1 determined at block 1026, where U1 can predict how long before colorant replacement will be needed for printing device PD1.

In some embodiments, after the procedures of block 1028 are completed, method 1000 can be completed, and the colorant replacement prediction algorithm can be terminated. In other embodiments, part or all of method 1000 and/or the colorant replacement prediction algorithm can be executed as part of a loop or other repeated sequence of instructions, and can be terminated upon specific request; e.g., upon receiving one or more inputs related to termination (e.g., a command to "END" the algorithm), upon closure of a window or other user interface component, upon termination of a thread, upon process termination, etc. The termination of method 1000 and/or the colorant replacement prediction algorithm can lead to completion of block 380 of method 300, and thus the completion of method 300.

Figure 10B:
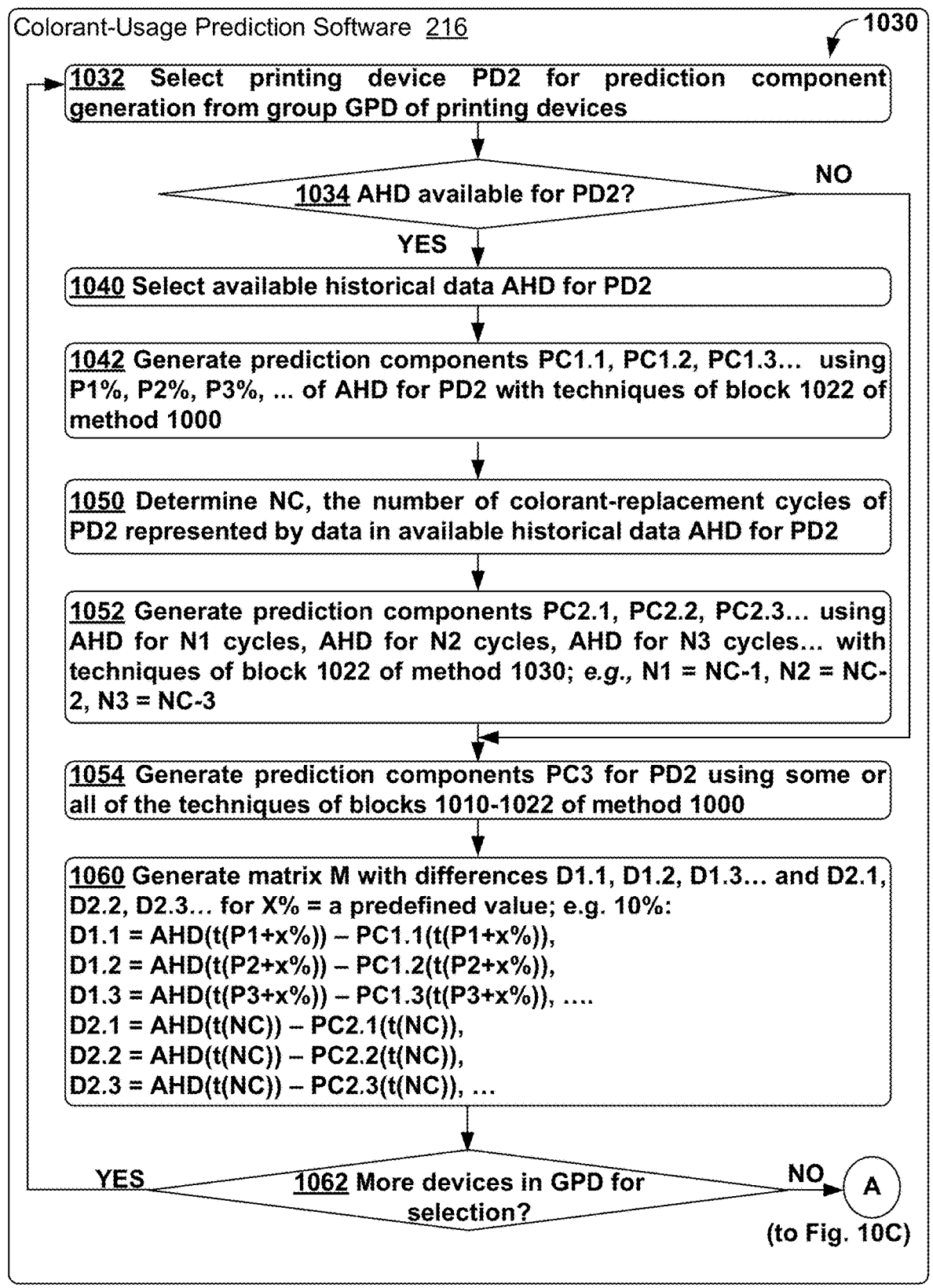
FIGS. 10B and 10C show a flowchart illustrating another colorant replacement prediction algorithm, according to an example embodiment.
Figure 10C:
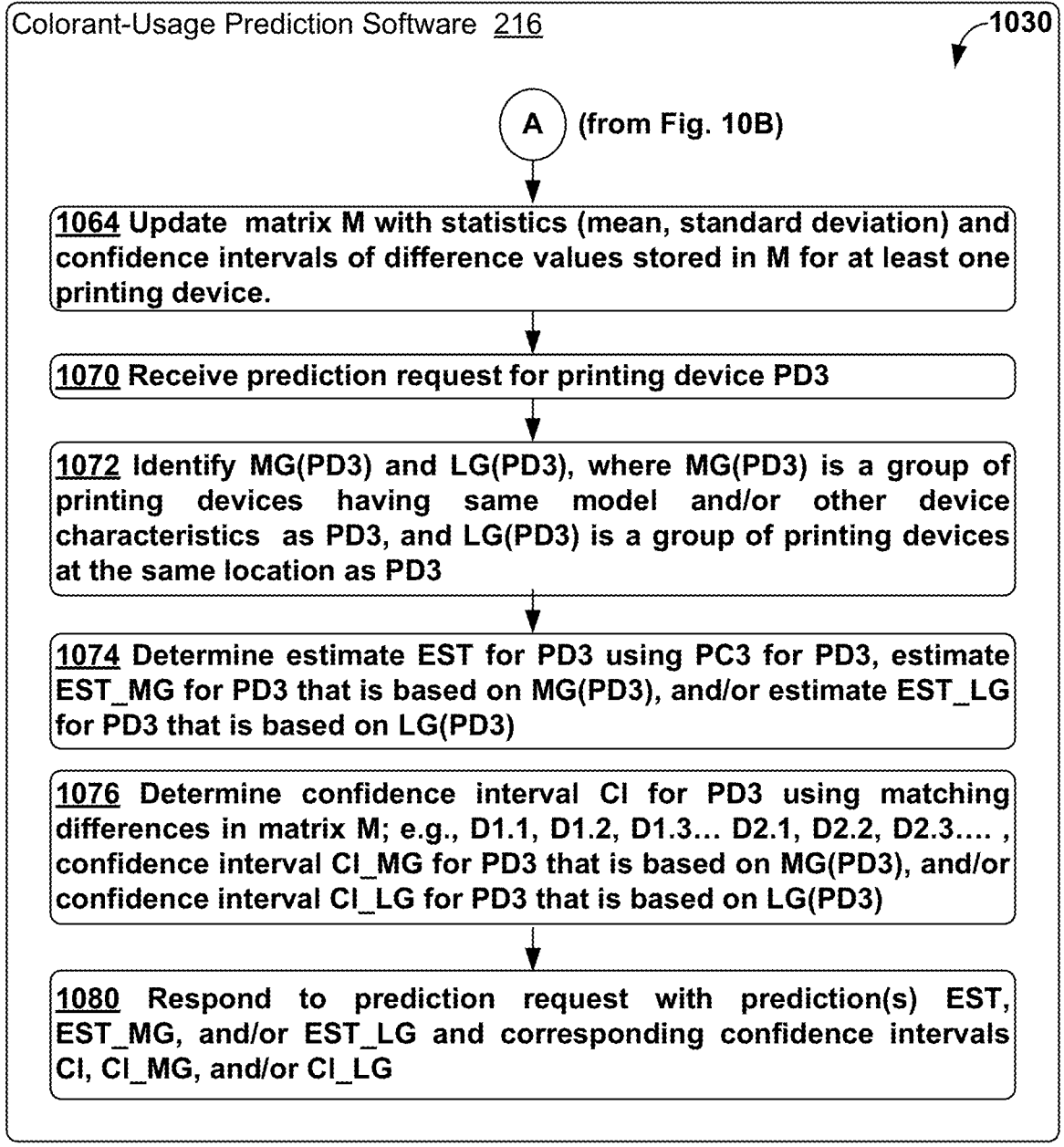

FIGS. 10B and 10C show a flowchart illustrating method 1030 for another colorant replacement prediction algorithm, according to an example embodiment. Method 1030 can be used by colorant-usage prediction software 216 to determine predictions of printer usage and related confidence interval information. In some embodiments, method 1030 can use some or all the procedures of method 1000 to determine a prediction of colorant usage. Method 1030 also provides confidence interval information related to the prediction of colorant usage. The prediction of colorant usage and/or the confidence interval information can be stored in a matrix.

As shown in FIG. 10B, method 1030 can begin at block 1032, where colorant-usage prediction software 216 can select a printing device PD2 from a group GPD of printing devices. Printing device PD2 can be selected from one or more printing devices that either do not have prediction components and/or confidence interval information or do have prediction components and/or confidence interval information and those prediction components and/or confidence interval information are to be updated. Group GPD can be a group of one or more printing devices that includes PD2.

At block 1034, colorant-usage prediction software 216 can determine if available historical data AHD is available for printing device PD2. For example, PD2 may not have any available historical data or may not have enough available historical data to carry out the procedures of blocks 1042-1052; e.g., the printer has not been in service for enough time to obtain available historical data AHD. In some embodiments, colorant-usage prediction software 216 can determine if available historical data AHD is available based on determining a number of months NM(PD2) of available historical data that is accessible for PD2 and comparing NM(PD2) to an available predetermined monthly-data threshold; e.g., NM(PD2) indicates AHD represents at least 3 months of data, at least 5 months of data, at least 10 months of data, etc. In other embodiments, colorant-usage prediction software 216 can determine if available historical data AHD is available based on determining a number of colorant-replacement cycles NC(PD2) represented in available historical data that is accessible for PD2 and comparing NC(PD2) to an available predetermined monthly-data threshold; e.g., NC(PD2) indicates AHD represents at least 3 replacement cycles, at least 4 replacement cycles, at least 8 replacement cycles, etc. In still other embodiments, colorant-usage prediction software 216 can determine that AHD requires NS(PD2) amount of storage; e.g., a number of bytes of storage and then determine if NS(PD2) is greater than an available predetermined data-storage-amount threshold; e.g., 5000 bytes of storage, 10 kilobytes of storage, etc. Other techniques, such as determining if AHD represents more than available predetermined number of reports related to usage data, are possible as well.

If PD2 has AHD available, then colorant-usage prediction software 216 can proceed to block 1040. Otherwise, PD2 does not have AHD available, and colorant-usage prediction software 216 can proceed to block 1054.

At block 1042, colorant-usage prediction software 216 can generate prediction components PC1.1, PC1.2, PC1.3, . . . based on portions of AHD. Each of prediction components PC1.1, PC1.2, PC1.3, . . . can include linear, periodic, and/or additional components; e.g., components regarding colorant usage, wear-off and/or colorant capacity.

Colorant-usage prediction software 216 can select respective portions P1%, P2%, P3%, . . . of the available historical data AHD that is related to PD2; e.g., P1% can be one of 1%, 10%, 20%, 30% . . . , P2% can be one of 2%, 20%, 40%, 60%, P3% can be one of 3%, 30%, 60%, 90% . . . , etc. In some embodiments, selected portions of AHD can overlap; e.g., the P1% of AHD can be the first P1% of AHD, the P2% of AHD can be selected as the first P2% of AHD, etc. In other embodiments, respective portions can be selected to be different ranges of AHD; e.g, P1 can represent a first portion (e.g., the first 1%, 5%, 10%, or 20%) of AHD, P2 can represent a second portion (e.g., the second 1%, 5%, 10%, or 20%) of AHD, etc.

Then, after selecting an incomplete portion (that is, less than 100%) of AHD, colorant-usage prediction software 216 can generate prediction components using the techniques of block 1022 of method 1000 operating on the selected incomplete portion of AHD. For example, PC.1.1 can be generated using P1% of AHD, PC1.2 can be generated using P2% of AHD, PC1.3 can be generated using P3% of AHD, etc. The remaining portion of AHD not used to generate a respective prediction component can be used for training, verification, determination of confidence levels, and/or other purposes related to the respective prediction components.

At block 1050, colorant-usage prediction software 216 can determine a number of colorant-replacement cycles NC for printing device PD2 that are represented in the available historical data AHD. For example, if no data regarding colorant usage by PD2 is represented in available historical data AHD, then NC can be set to 0. If available historical data AHD includes some data regarding colorant usage by PD2 but does not include data regarding colorant-replacement events, then NC can be set to 1, representing usage of PD2 with initially-provided colorant. If available historical data AHD includes data regarding colorant-replacement events, then NC can be set to the number of colorant-replacement events for PD2 represented in available historical data AHD+1. For example, if AHD includes data about two toner change events for PD2, then NC can be set to 2+1=3. Other examples are possible.

At block 1052, colorant-usage prediction software 216 can generate prediction components PC2.1, PC2.2, PC2.3 . . . based on portions of AHD. Each of prediction components PC1.1, PC1.2, PC1.3 . . . can include linear, periodic, and/or additional components; e.g., components regarding colorant usage, wear-off and/or colorant capacity.

Colorant-usage prediction software 216 can select respective portions of available historical data AHD based on numbers N1, N2, N3 . . . of colorant-replacement cycles represented in AHD; e.g., N1 can be one of 1, 2, . . . NC-5, NC-4, NC-3, etc.; N2 can be one of 2, 3, . . . NC-4, NC-3, NC-2, etc.; N3 can be one of 3, 4, . . . NC-3, NC-2, NC-1, etc. In some embodiments, selected portions of AHD can overlap; e.g., the portion of AHD related to N1 can be the first portion of AHD relating to N1 colorant-replacement cycles; the portion of AHD related to N1 can be the first portion of AHD relating to N2 colorant-replacement cycles, etc. In other embodiments, respective portions can be selected to be different ranges of AHD; e.g, N1 can be 1 (or X1, with 1≤X1≤NC) to represent a portion of AHD corresponding to a first (or X1st) colorant-replacement cycle, N2 can be 2 (or X2, with 1≤X2≤NC, and X1≠X2), etc.

Then, after selecting an incomplete portion of AHD related to a number of colorant-replacement cycles, colorant-usage prediction software 216 can generate prediction components using the techniques of block 1022 of method 1000 operating on the selected incomplete portion of AHD. For example, PC.2.1 can be generated using a portion of AHD representing N1 colorant replacement cycles, PC2.2 can be generated using a portion of AHD representing N2 colorant replacement cycles, PC2.3 can be generated using a portion of AHD representing N3 colorant replacement cycles etc. The remaining portion of AHD not used to generate a respective prediction component can be used for training, verification, determination of confidence levels, and/or other purposes related to the respective prediction components.

At block 1054, colorant-usage prediction software 216 can generate prediction components PC3 based on printer information related to PD2 and/or available historical information AHD, including a complete portion (e.g., 100%) of AHD. Prediction components PC3 include linear, periodic, and/or additional components; e.g., components regarding colorant usage, wear-off and/or colorant capacity. For example, colorant-usage prediction software 216 can generate prediction components PC3 using some or all of the techniques of blocks 1010-1022 of method 1000.

At block 1060, colorant-usage prediction software 216 can generate a matrix M to store differences D1.1, D1.2, D1.3, . . . and D2.1, D2.2, D2.3, . . . Differences D1.1, D1.2, D1.3 . . . can be based on prediction components PC1.1, PC1.2, PC1.3 . . . determined at block 1042. Differences D2.1, D2.2, D2.3 . . . can be based on prediction components PC2.1, PC2.2, PC2.3 . . . determined at block 1052.

Each difference of D1.1, D1.2, D1.3, . . . and D2.1, D2.2, D2.3 . . . can be determined using Equation (7):

$$\text{Diff}(t) = \text{Known}(t) - \text{Pred}(t) \qquad (7)$$

where:

Diff(t) is a difference in colorant-usage values for a given time t,

Known(t) is a known colorant-usage value at time t, and

Pred(t) is a predicted colorant-usage value at time t.

As mentioned above, each of prediction components PC1.1, PC1.2, PC1.3 . . . and prediction components PC2.1, PC2.2, PC2.3 . . . is based on an incomplete portion of AHD. Then, to determine Diff(t), the time t can correspond to a portion of AHD that was not used in generating prediction components for determining Pred(t). For example, suppose PC1.1 for a printing device PD is determined using the first 30% of available historical data AHD for PD, then t can be a value later in time than times corresponding to values represented in the first 30% of AHD. That is, if AHD for PD is available for the first 100 months PD was used and the first 30% of AHD used to generate PC1.1 represents the first 30 months that PD was used, time t can be selected to be a time after than the first 30 months PD was used.

As shown in block 1060 of FIG. 10B, difference value D1.1 can be a difference between a known value, AHD(t (P1+x %)), and a predicted value, PC1.1(t(P1+x %)), where P1 is a percentage of AHD used to determine PC1.1, x % is a predefined value; e.g., 1%, 5%, 10%. And t(P1+x %) can be a time related to a percentage value P1+x % corresponding to a portion of AHD. That is, if PC1.1 is generated using the first P1% of AHD, then t(P1+x %) is a time corresponding to the first P1+x % of AHD. As a specific example, if AHD represents 100 months of usage, P1=the first 30% of AHD and x %=10%, then D.1.1=AHD(t(40%))−PC1.1(t (40%)) with time t(40%) corresponding to the first 40% of AHD; that is, a time corresponding to (about) 40 months of usage as recorded in AHD.

Similarly, difference D1.2 can be determined using Equation (7) for prediction components PC1.2 generated using incomplete portion P2% of AHD, where Diff(t) of Equation (7) corresponds to D1.2, t(P2+x %) is a time corresponding to a portion P2+x % of AHD, x % is as discussed above for difference D1.1, Pred(t) of Equation (7) corresponds to PC1.2 predicting colorant-usage at time t(P2+x %), and Known(t) of Equation (7) corresponds to colorant-usage at time t(P2+x %) as recorded in AHD. Also, difference D1.3 can be determined using Equation (7) for prediction components PC1.3 generated using incomplete portion P3% of AHD, where Diff(t) of Equation (7) corresponds to D1.3, t(P3+x %) is a time corresponding to a portion P3+x % of AHD, x % is as discussed above for differences D1.1 and D1.2, Pred(t) of Equation (7) corresponds to PC1.3 predicting colorant-usage at time (P3+x %), and Known(t) of Equation (7) corresponds to colorant-usage at time (P3+x %) as recorded in AHD.

FIG. 10D shows example matrix 1090 corresponding to matrix M of method 1030. Matrix 1090 is also reproduced in Tables 1 and 2 below, where Table 1 reproduces the PC1 data 1092 of matrix 1090 and Table 2 reproduces the PC2 data 1094 of matrix 1090, using the abbreviation "CI" for "Conf. Int" or confidence interval.

TABLE 1

(PC1 Data 1092 of FIG. 10D)

| Time | PD1 | PD2 | PD3 | PD4 | . . . | PDx | −2SD | −1SD | Mean | +1SD | +2SD | CI (days) |
|---|---|---|---|---|---|---|---|---|---|---|---|---|
| 3 mo. | 3 | 2 | 8 | −9 | | −5 | −12.3 | −6.2 | −0.2 | 5.8 | 11.9 | [−6, +6] |
| 4 mo. | 4 | −4 | 6 | 2 | | 4 | −4.5 | −1.0 | 2.4 | 5.8 | 9.3 | [−1, +6] |
| 5 mo. | −3 | 7 | 4 | 0 | | 3 | −4.7 | −1.2 | 2.2 | 5.6 | 9.1 | [−1, +6] |
| 6 mo. | −5 | 3 | 4 | 3 | | 2 | −5.1 | −1.9 | 1.4 | 4.7 | 7.9 | [−2, +5] |
| 7 mo. | −1 | 2 | 3 | 2 | | 1 | 0.3 | 1.1 | 1.8 | 2.5 | 3.3 | [+1, +3] |

TABLE 2

(PC2 Data 1094 of FIG. 10D)

| # of cycles | PD1 | PD2 | PD3 | PD4 | PDx | −2SD | −1SD | Mean | +1SD | +2SD | CI (days) |
|---|---|---|---|---|---|---|---|---|---|---|---|
| 3 mo. | 6 | 0 | −1 | 2 | −9 | −10.2 | −5.3 | −0.4 | 4.5 | 9.4 | [−5, +5] |
| 4 mo. | 4 | −3 | 3 | −4 | 6 | −6.7 | −2.8 | 1.2 | 5.2 | 9.1 | [−3, +5] |
| 5 mo. | 2 | −5 | 9 | −1 | −6 | −11.0 | −5.6 | −0.2 | 5.2 | 10.6 | [−6, +5] |
| 6 mo. | −4 | −2 | −1 | −5 | 3 | −7.4 | −4.6 | −1.8 | 1.0 | 3.8 | [−5, +1] |
| 7 mo. | −1 | 3 | 5 | 6 | 0 | −2.9 | −0.1 | 2.6 | 5.3 | 8.1 | [0, +6] |

PC1 data 1092 and Table 1 indicate that matrix M can store differences between prediction components generated using different incomplete portions of AHD. The first non-heading row of PC1 data 1092 and Table 1 includes difference values related to prediction components generated using less than 3 months of available historical data for respective printing devices PD1, PD2, PD3, PD4, and PDx are 3, 2, 8, −9, and −5, respectively.

The 3 month difference values in PC1 data 1092 and Table 1 can be determined using Equation (7), with t=3 months, Known(t) being colorant-usage values of available historical data for respective printing devices PD1, PD2, PD3, PD4, and PDx, and Pred(t) being predicted colorant-usage values determined by the respective prediction components generated using less than 3 months of available historical data for respective printing devices PD1, PD2, PD3, PD4, and PDx. Similarly, respective PD1, PD2, PD3, PD4, and PDx columns of PC1 data 1092 and Table 1 also show difference values for 4 month, 5 month, 6 month, and 7 months for each of respective printing devices PD1, PD2, PD3, PD4, and PDx.

As shown in block 1060 of FIG. 10B, difference value D2.1 can be a difference between a known value, AHD(t (NC)), and a predicted value, PC2.1(t(NC)), where NC can be the number of colorant replacement cycles determined at block 1050 and t(NC) can be a time related to the NC colorant replacement cycles. As discussed above in the context of block 1052, PC2.1 can be generated using an incomplete portion of AHD corresponding to N1 colorant replacement cycles, where 1≤N1<NC. Also, t(NC) can be a time corresponding to the complete portion of AHD as AHD represents NC colorant replacement cycles. Then, D2.1 can be a difference between a known value AHD(t(NC)) related to a time representing the complete portion of AHD and a prediction P2.1(t(NC)) for the time representing the complete portion of AHD, where the prediction is generated by prediction components P2.1 that are generated using an incomplete portion of AHD.

Similarly, difference D2.2 can be determined using Equation (7) for prediction components PC2.2 generated using an incomplete portion of AHD corresponding to N2 colorant replacement cycles, where 2≤N2<NC, where Diff(t) of Equation (7) corresponds to D2.2, t(NC) is the time corresponding to the complete portion of AHD as discussed above for difference D2.1, Pred(t) of Equation (7) corresponds to PC2.2 predicting colorant-usage at time t(NC), and Known(t) of Equation (7) corresponds to colorant-usage at time t(NC) as recorded in AHD.

Also, difference D2.3 can be determined using Equation (7) for prediction components PC2.3 generated using an incomplete portion of AHD corresponding to N3 colorant replacement cycles, where 3≤N3<NC., where Diff(t) of Equation (7) corresponds to D2.3, t(NC) is the time corresponding to the complete portion of AHD as discussed above for differences D2.1 and D2.2, Pred(t) of Equation (7) corresponds to PC2.3 predicting colorant-usage at time t(NC), and Known(t) of Equation (7) corresponds to colorant-usage at time t(NC) as recorded in AHD.

PC2 data 1094 of FIG. 10D and Table 2 indicate that matrix M can store differences between prediction components generated using different incomplete portions of AHD. The first non-heading row of PC2 data 1094 and Table 2 includes difference values related to prediction components generated using available historical data corresponding to 3 colorant-replacement cycles for respective printing devices PD1, PD2, PD3, PD4, and PDx are 6, 0, −1, 2, and −9 respectively.

The 3 cycle difference values in PC2 data 1094 and Table 2 can be determined using Equation (7), with t related to three colorant-replacement cycles of data, Known(t) being colorant-usage values of available historical data for respective printing devices PD1, PD2, PD3, PD4, and PDx, and Pred(t) being predicted colorant-usage values determined by the respective prediction components generated using available historical data that is less than 3 colorant-replacement cycles for respective printing devices PD1, PD2, PD3, PD4, and PDx. Similarly, respective PD1, PD2, PD3, PD4, and PDx columns of PC1 data 1092 and Table 1 also show difference values for 4 colorant-replacement cycles, 5 colorant-replacement cycles, 6 colorant-replacement cycles, and 7 colorant-replacement cycles for each of respective printing devices PD1, PD2, PD3, PD4, and PDx.

In other examples, Matrix M can store data from more, fewer, and/or different printing devices and/or differences corresponding to more, fewer, and/or different amounts of time and/or colorant-replacement cycles.

FIG. 10B shows that, at block 1062, colorant-usage prediction software 216 can determine whether there are more printing devices in group GPD for selection for prediction component generation. For example, colorant-usage prediction software 216 can track which devices in group GPD have been selected and so determine if all of the devices in group GPD have been selected.

If colorant-usage prediction software 216 determines that there are more printing devices in group GPD for selection for prediction component generation, colorant-usage prediction software 216 can proceed to block 1032. Otherwise, colorant-usage prediction software 216 can determine that there are no more printing devices in group GPD for selection for prediction component generation, and can proceed to block 1064, which is depicted on FIG. 10C.

At block 1064, colorant-usage prediction software 216 can update matrix M with statistics and confidence intervals using the already-stored differences values D1.1, D1.2, D1.3 . . . and D2.1, D2.2, D2.3 . . . for at least one printing device whose difference values are stored in matrix M.

The statistics on difference values can be calculated for groups of printing devices, such as, but not limited to, a group of all printing devices having difference values stored in matrix M, a group of printing devices associated with a particular location (or locations) having difference values stored in matrix M, a group of printing devices associated with particular device information (such as sharing a common manufacturer, or sharing common manufacture and model names) having difference values stored in matrix M, and a group of printing devices associated with a particular entity (person, organization, owner, operator, service provider, etc.) having difference values stored in matrix M, and a group of user-selected printing devices having difference values stored in matrix M. Other groups of printing devices are possible as well. These statistics can include, but are not limited to, mean values, median values, modes, variance values, standard deviation values, test statistics, quantile values (percentiles, quartiles, deciles), maximum values, minimum values, and mathematical combinations of these statistics.

For example, the first non-heading row of matrix 1090 shown in FIG. 10D and corresponding row of Table 1 shows that the group of printing devices {PD1, PD2, PD3, PD4, PDx} have five difference values associated with three months of AHD: a difference of 3 days associated with printing device PD1, a difference of 2 days associated with printing device PD2, a difference of 8 days associated with printing device PD3, a difference of −9 days associated with printing device PD4, and a difference of −5 days associated with printing device PDx.

The mean of these five values is −0.2, as shown in the "Mean" column's cell of the first non-heading row of matrix 1090 and Table 1. The standard deviation of these five values is 6.0. The sum of mean and standard deviation values is 5.8, as shown in the "+1SD" column cell of the first non-heading row of matrix 1090 and Table 1, and the difference of the mean and standard deviation values is −6.2, as shown in the "−1SD" column cell of the first non-heading row of matrix 1090 and Table 1. Further, the sum of the mean value and two times the standard deviation value is, after rounding, 11.9, as shown in the +2SD" column cell of the first non-heading row of matrix 1090 and Table 1. Additionally, the difference of the mean value and two times the standard deviation value is, after rounding, −12.3, as shown in the "−2SD" column cell of the first non-heading row of matrix 1090 and Table 1.

Sums and differences of mean and standard deviation values of data sets can be used to determine confidence intervals. For example, for the data set of the five difference values associated with three months of AHD mentioned immediately above, a confidence interval can be determined to be the range [−1SD, +1SD]; that is the range of values [−6.2, +5.8]. This range of values, after rounding to integer values [−6, +6] is shown in the "Conf. Int. (days)" column cell of the first non-heading row of matrix 1090 and the corresponding "CI (days" column cell of Table 1. Other ranges of values, e.g., [−2SD, +2SD], [−1.5SD, +1.5SD] can be used as confidence intervals as well.

Matrix 1090 and corresponding Tables 1 and 2 above show that matrix M can store difference values, mean values, and mean±standard deviation values. In other examples, matrix M can store additional values. In some embodiments, prediction values generated by prediction components PC3 and related statistical values can be stored in matrix M. Also, once values are stored in matrix M, colorant-usage prediction software 216 can retrieve the stored values for one or more uses; e.g., uses related to responding to requests for prediction and/or confidence level information.

At block 1070, colorant-usage prediction software 216 can receive a request to predict colorant usage for a printing device PD3. PD3 can be a printing device in group GPD selected by colorant-usage prediction software 216 at block 1032 for generating prediction components and corresponding confidence intervals. In some embodiments, colorant-usage prediction software 216 can use the procedures of block 1024 of method 1000 shown in FIG. 10A to receive the request to predict colorant usage for PD3. Requests to predict colorant usage are discussed above in more detail in the context of block 1024.

At block 1072, colorant-usage prediction software 216 can identify groups of printing devices MG(PD3) and LG(PD3). MG(PD3) can be a sub-group of group GPD that can include printing devices having the same (or similar) device characteristics, such as model information, as PD3. LG(PD3) can be a sub-group of group GPD that can include printing devices having at the same, nearby, or otherwise related (e.g. co-owned) location as PD3. In other embodiments, other sub-groups of printing devices related to PD3 can be identified.

At block 1074, colorant-usage prediction software 216 can determine a prediction (or estimate) EST of PD3's colorant usage based on prediction components PC3, a prediction EST_MG of PD3's colorant usage based on prediction components related to group MG(PD3), and/or a prediction EST_LG of PD3's colorant usage based on prediction components related to group LG(PD3). For example, estimates for printing devices in group MG(PD3) (and/or group LG(PD3)) can be determined and used; e.g., combined to determine estimate EST_MG (and/or estimate EST_LG). In some embodiments, the predictions EST, EST_MG, and/or EST_LG can be determined based on matrix M discussed above with respect to blocks 1060 and 1064. In these embodiments, some or all of EST, EST_MG, and EST_MG can be stored in matrix M and subsequently retrieved from matrix M by colorant-usage prediction software 216.

At block 1076, colorant-usage prediction software 216 can determine a corresponding confidence interval CI for prediction EST of PD3's colorant usage, a corresponding confidence interval CI_MG for prediction EST_MG of PD3's colorant usage related to group MG(PD3), and/or a corresponding confidence interval CI_LG for prediction EST_LG of PD3's colorant usage related to group LG(PD3). In some embodiments, the confidence interval CI_MG (and/or confidence interval CI_LG) can be determined based on matrix M discussed above with respect to blocks 1060 and 1064. In these embodiments, some or all of CI, CI_MG, and CI_LG can be stored in matrix M and subsequently retrieved from matrix M by colorant-usage prediction software 216. For example, confidence intervals for printing devices in group MG(PD3) (and/or group LG(PD3)) can be determined and used; e.g., combined to determine confidence interval CI_MG (and/or confidence interval CI_LG).

At block 1080, colorant-usage prediction software 216 can respond to the request to predict colorant usage for printing device PD3 received at block 1070. Colorant-usage prediction software 216 can generate and send a response that includes one or more estimates of colorant usage EST, EST_MG, and/or EST_LG and one or more respective corresponding confidence intervals CI, CI_MG, and/or CI_LG. The response can be sent to the device that sent the prediction request received at block 1070. For example, colorant-usage prediction software 216 can respond to the request to predict colorant usage for printing device PD3 received at block 1070 by generating and sending a response of one or more messages that include estimate EST and corresponding confidence interval CI to predict how long before colorant replacement will be needed for printing device PD3.

In some embodiments, one or two of the three predictions EST, EST_MG, and EST_LG and respective corresponding confidence intervals CI, CI_MG, and/or CI_LG are provided in the response to the request to predict colorant usage for printing device PD3 received at block 1070. In these embodiments, some aspects of the procedures of blocks 1072-1076 can be omitted. For example, suppose only estimate EST and corresponding confidence interval CI are provided in the response to the request to predict colorant usage for printing device PD3 received at block 1070. In this example, the procedures of block 1072 can be omitted, and aspects of the procedures of blocks 1074 and 1076 related to groups MG(PD3) and LG(PD3) can be omitted as well.

In other embodiments, after the procedures of block 1080 are completed, method 1030 can be completed, and the colorant replacement prediction algorithm can be terminated.

In even other embodiments, part or all of method 1030 can be executed as part of a loop or other repeated sequence of instructions, and can be terminated upon specific request such as discussed above in the context of method 1000 and FIG. 10A. The termination of method 1030 and/or the colorant replacement prediction algorithm can lead to completion of block 380 of method 300, and thus the completion of method 300.

In still other embodiments, the techniques of method 1030 can be broken into two (or more) sub-methods. For example, the techniques associated with blocks 1032-1064 can be executed as a first sub-method and the techniques associated with blocks 1070-1080 can be executed as a second sub-method. The first sub-method can be executed by colorant-usage prediction software 216 when new printer data is obtained, on a periodic (e.g., on an hourly, daily, or weekly basis) basis perhaps using batch or background execution, or on some other basis; e.g., on an on-demand basis. The second sub-method can be executed once one or more prediction requests are received by colorant-usage prediction software 216 until one or more responses to the one or more prediction requests are sent from colorant-usage prediction software 216.

Scenario 1100 can illustrate how toner predictions can be provided to printing device users. In scenario 1100, a user of a computing device that can provide a graphical user interface (GUI), such as computer 120 or computer 122, can use the GUI to generate a display listing printing devices. The display listing printing devices can be used to select a printing device. Once a printing device is selected, the display can be updated to provide an estimated time to replace colorant for the printing device along with a confidence interval associated with the estimated time. The estimated time to estimated time to replace colorant for the printing device and the confidence interval can be determined, at least in part, by carrying out method 300 discussed above in the context of FIGS. 3-10C. Scenario 1100 can continue by the user of the computing device using the GUI to add a new printing device. After adding the new printing device, scenario 1100 can end.

Figure 11A:
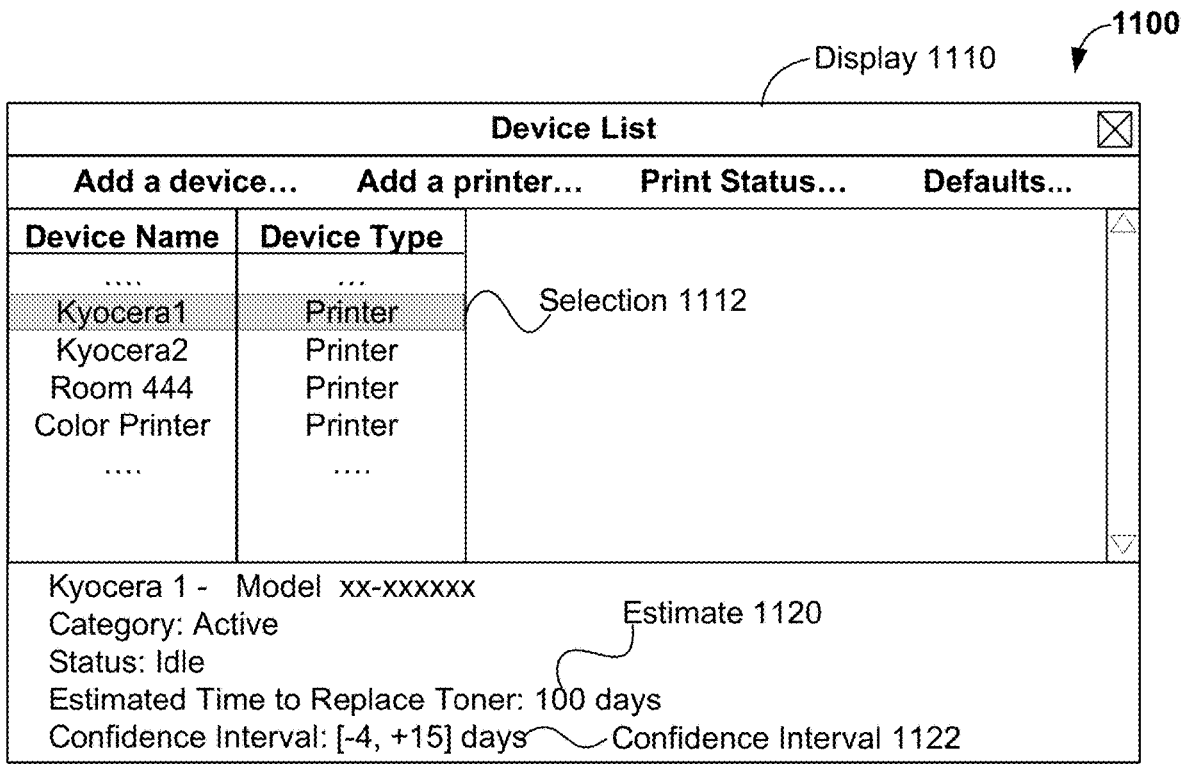
FIG. 11A shows displays related to predicting colorant replacement for example printing devices, according to an example embodiment.
Figure 11A:
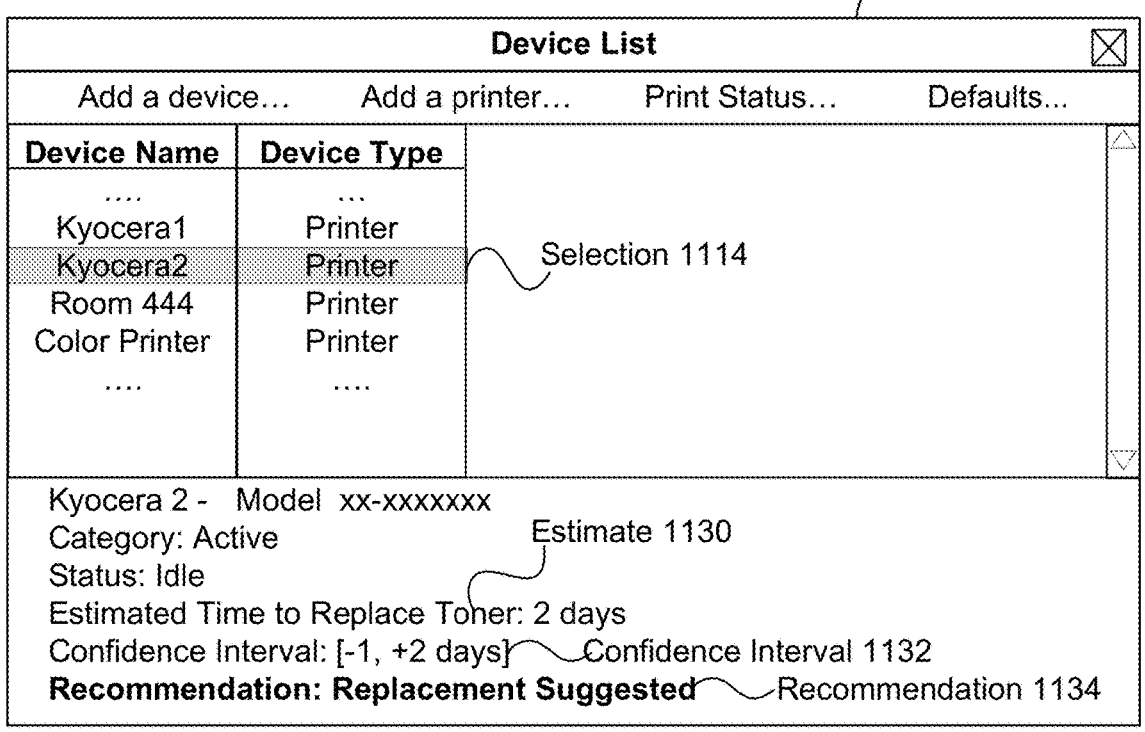

FIG. 11A shows a display 1110 related to predicting colorant replacement for example printing devices, according to an example embodiment. Scenario 1100 begins by the computing device providing a GUI that displays display 1110 as shown at the top of FIG. 11A. Display 1110 shows a device list with four printing devices named as: Kyocera1, Kyocera2, Room 444, and Color Printer. As part of scenario 1100, the Kyocera1 printing device selected, as indicated by selection 1112 at the top of FIG. 11A. Upon selection of the Kyocera1 printing device, the computing device can generate a request to predict colorant usage for the Kyocera1 printing device. Requests to predict colorant usage are discussed above at least in the context the colorant replacement prediction algorithm discussed in the context of at least FIGS. 3 and 10A-10C. In scenario 1100, the computing device sends the request to predict colorant usage for the Kyocera1 printing device to a prediction server. Upon reception of the request to predict colorant usage, the prediction server carries out at least the colorant replacement prediction algorithm of method 300 to determine a prediction of colorant usage for the Kyocera1 printing device and information related to a confidence interval for the prediction of colorant usage. The prediction server then generates a response that includes the prediction of colorant usage and related confidence interval for the Kyocera1 printing device and sends the response to the computing device.

Upon reception of the response for the Kyocera1 printing device, the computing device obtains the prediction of colorant usage and related confidence interval for the Kyocera1 printing device and updates display 1110 with estimate 1120 and confidence interval 1122 as shown in FIG. 11A. In particular, display 1110 shows estimate 1120 indicating the prediction of colorant usage for the Kyocera1 printing device with an "Estimated Time to Replace Toner" of "100 days" and confidence interval 1122 showing the prediction having a confidence interval of "[−4, +15] days". That is, display 1110 indicates that the toner will have to be changed for the Kyocera1 printing device in a time interval of {100+[−4, +15]}) days, or in other words, the toner for the Kyocera1 printing device will have to be changed between 96 and 115 days.

Scenario 1100 continues with selection of the Kyocera2 printing device, such as shown by selection 1114 of display 1110 at the bottom of FIG. 11A. Upon receiving selection 1114, the computing device can generate a request to predict colorant usage for the Kyocera2 printing device and send the request to predict colorant usage to a prediction server, such as discussed above regarding the request to predict colorant usage for the Kyocera1 printing device. Then, the prediction server can send the computing device a response that includes the prediction of colorant usage and related confidence interval for the Kyocera2 printing device, such as discussed above regarding the response to the request to predict colorant usage for the Kyocera1 printing device.

Upon reception of the response for the Kyocera2 printing device, the computing device obtains the prediction of colorant usage and related confidence interval for the Kyocera1 printing device and updates display 1110 with estimate 1130, confidence interval 1132, and recommendation 1134 as shown in FIG. 11A. In particular, display 1110 shows estimate 1130 indicating the prediction of colorant usage for the Kyocera2 printing device with an "Estimated Time to Replace Toner" of "2 days" and confidence interval 1132 showing the prediction having a confidence interval of "[−1, +2] days". That is, display 1110 indicates that the toner will have to be changed for the Kyocera2 printing device in a time interval of {2+[−1, +2]}) days, or in other words, the toner for the Kyocera2 printing device will have to be changed between 1 and 4 days.

In some embodiments, the response can include a recommendation related to the prediction; in other embodiments, the computing device can determine the recommendation related to the prediction based on the response. For example, upon determining that the toner will have to be replaced in a relatively short time; e.g., if the prediction is less than a threshold amount of time (e.g., one day, a week, 10 days), then the prediction server and/or the computing device can generate a recommendation for colorant replacement. For example, FIG. 11A shows recommendation 1134 indicating "Replacement Suggested" for the toner of the Kyocera2 printing device. In some embodiments, other techniques for displaying predictions of colorant usage, related confidence intervals, and recommendations regarding colorant replacement can be utilized than shown in FIG. 11A.

After displaying the prediction of colorant usage, related confidence interval, and recommendation regarding colorant replacement for the Kyocera2 printing device, scenario 1100 can continue by adding a new printing device named "Kyocera3" for use by the computing device. The new printing device can be added using a dialog or other display provided by the GUI of the computing device.

Figure 11B:
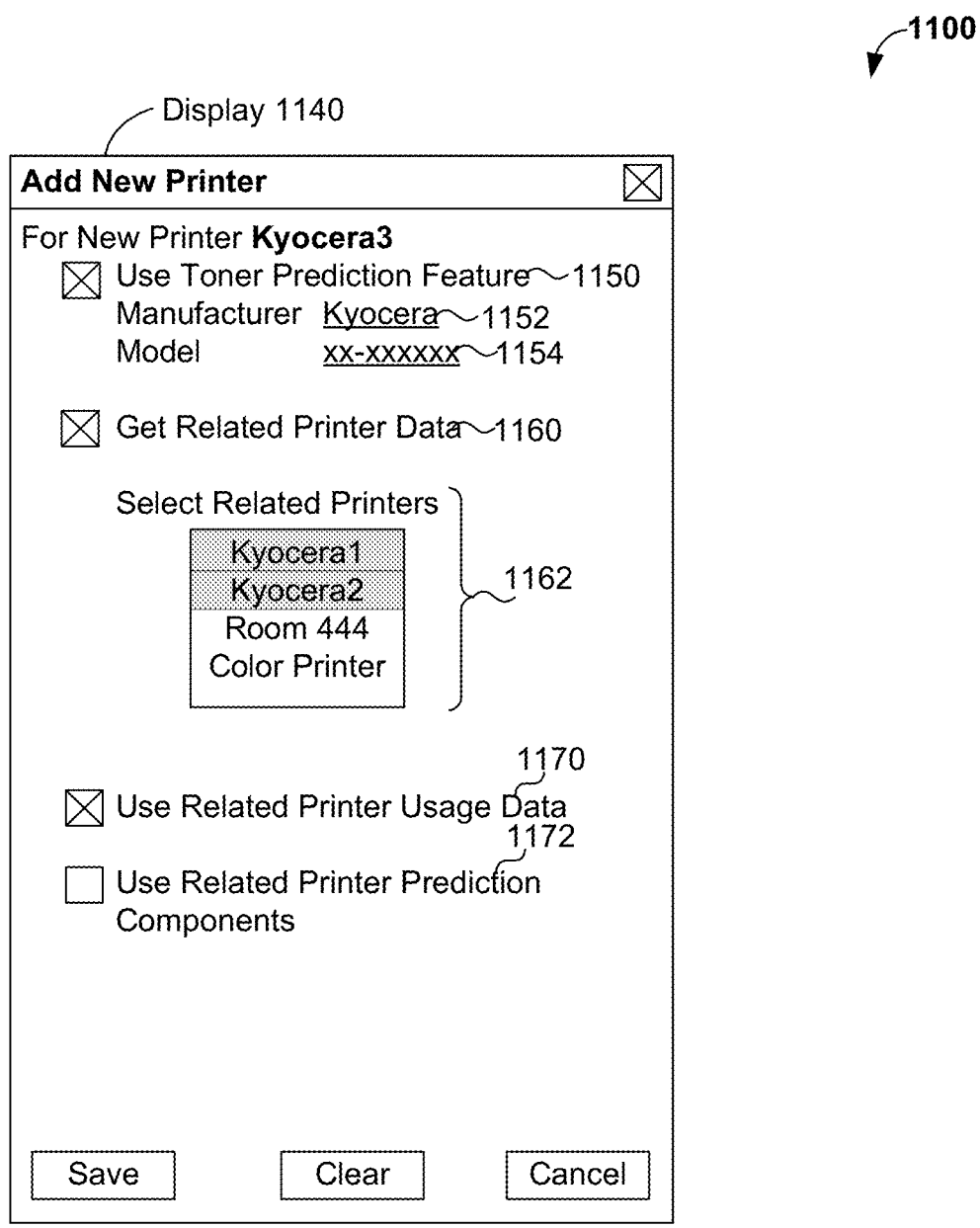
FIG. 11B shows display related to adding an example printing device, according to an example embodiment.

FIG. 11B shows display 1140 related to adding the new printing device, according to an example embodiment. Display 1140 includes a number of selectors, including use toner prediction feature selector 1150, get related printer data selector 1160, use related printer usage data selector 1170, and use related printer prediction components 1172.

Use toner prediction feature selector 1150 enables activation or deactivation of colorant prediction for the new "Kyocera3" printing device. FIG. 11B shows use toner prediction feature selector 1150 with an "X" indicating that the use toner prediction feature is to be activated for the new "Kyocera3" printing device. The use toner prediction feature selector also includes manufacturer field 1152 and model field 1154 for entering in respective manufacturer and model information. In the example shown in FIG. 11B, manufacturer field 1152 shows that "Kyocera" is the manufacturer and model field shows that "xx-xxxxxx" is the model of the new "Kyocera3" printing device.

Get related printer data selector 1160 enables activation or deactivation of the use of related printer data for colorant-usage prediction with the new "Kyocera3" printing device. FIG. 11B shows get related printer data selector 1160 with an "X" indicating that related printer data feature is to be used for colorant-usage prediction of the new "Kyocera3" printing device. The get related printer data selector includes select related printers list 1162 for selecting printing devices considered to be related to the new "Kyocera3" printing device.

In the example shown in FIG. 11B, select related printers list 1162 shows "Kyocera1" and "Kyocera2" in grey, indicating that the "Kyocera1" and "Kyocera2" printing devices are selected as related printing devices to the new "Kyocera3" printing device. Select related printers list 1162 also shows "Room 444" and "Color Printer" in white, indicating that the "Room 444" and "Color Printer" printing devices are not selected as related printing devices to the new "Kyocera3" printing device.

Use related printer usage data selector 1170 enables activation or deactivation of the use of related printer usage data in generating colorant-usage predictions. FIG. 11B shows use related printer usage data selector 1170 with an "X" indicating that related printer usage data is to be used for colorant-usage prediction of the new "Kyocera3" printing device. Use related printer prediction components 1172 enables activation or deactivation of the use of related printer prediction components in generating colorant-usage predictions. FIG. 11B shows use related printer prediction components 1172 without an "X" indicating that related printer prediction components are not be used for colorant-usage prediction of the new "Kyocera3" printing device.

In some embodiments, more, less, and/or different selectors and/or data can be provided regarding adding new printers and/or regarding use of the herein-described techniques for predicting colorant usage for one or more printing devices than shown in FIG. 11B.

IV. Example Methods of Operation

Figure 12:
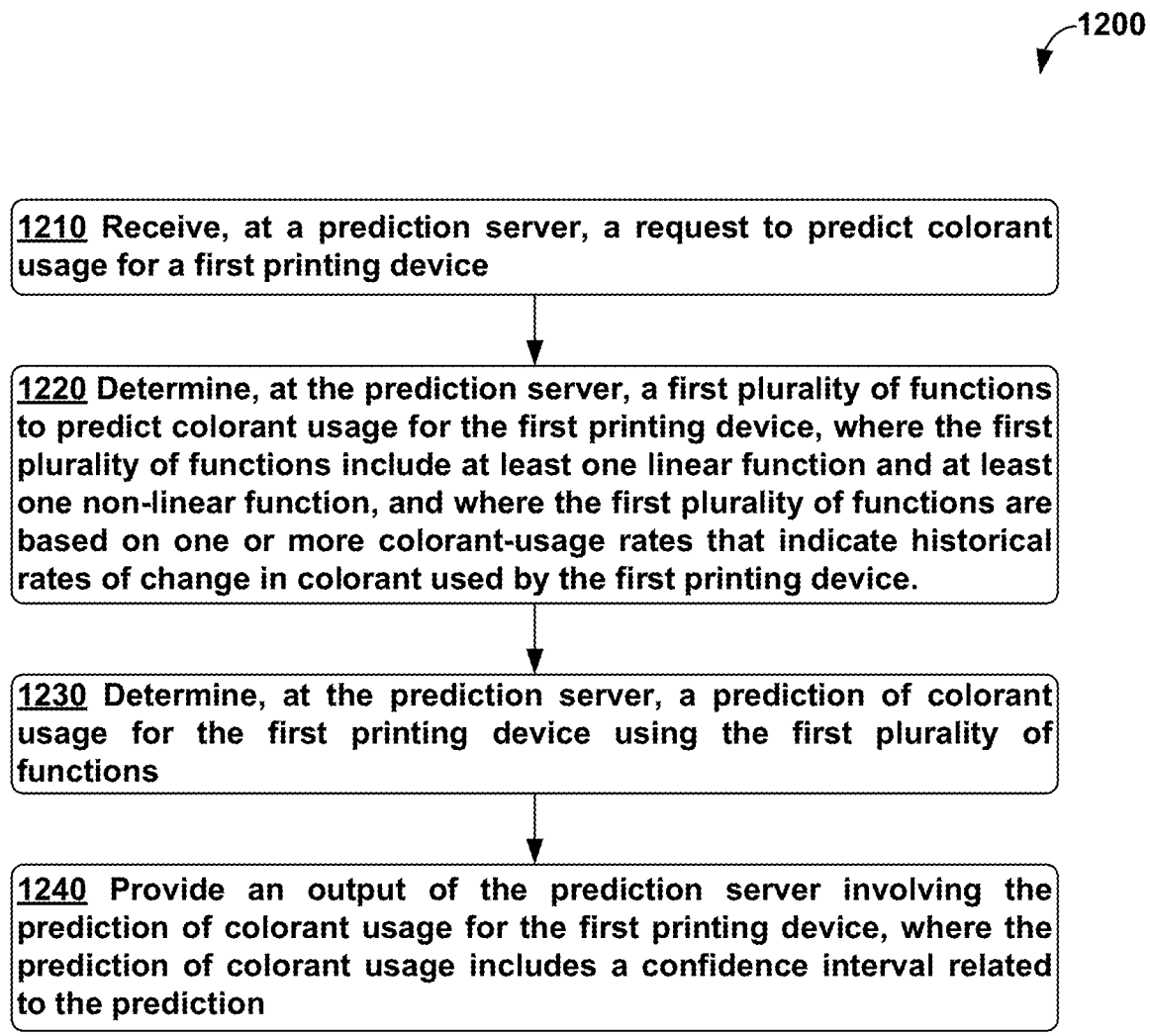
FIG. 12 shows a flowchart for a method, according to an example embodiment.

FIG. 12 shows a flowchart for method 1200, according to an example embodiment.

Method 1200 can be carried out by a prediction server, such as prediction server 130. In some embodiments, method 1200 can be carried out by a computing device that is not a prediction server.

Method 1200 can begin at block 1210, where the prediction server can receive a request to predict colorant usage for a first printing device, such as discussed above at least in the context of FIGS. 10A and 10B.

At block 1220, the prediction server can determine a first plurality of functions to predict colorant usage for the first printing device, where the first plurality of functions can include at least one linear function and at least one non-linear function, and where the first plurality of functions can be based on one or more colorant-usage rates that indicate historical rates of change in colorant used by the first printing device, such as discussed above at least in the context of FIGS. 3 and 10A-10D.

In some embodiments, the at least one non-linear function can include a periodic component; then, the periodic component can include one or more of: a weekly periodic component related to weekly usage of the first printing device, a monthly periodic component related to monthly usage of the first printing device, and a yearly periodic component related to yearly usage of the first printing device, such as discussed above at least in the context of at least FIGS. 3 and 7A-7C. In other embodiments, the first plurality of functions can include a function related to maintenance performed on the first printing device, such as discussed above at least in the context of FIGS. 3 and 8. In even other embodiments, the first plurality of functions can include a function related to colorant capacity of the first printing device, such as discussed above at least in the context of FIGS. 3 and 9. In still other embodiments, determining the first plurality of functions can include: obtaining current usage data from the first printing device, the current usage data including data related to toner usage by the first printing device; and determining historical usage data for the first printing device based on the current usage data, where the historical usage data includes at least one colorant-usage rate of the one or more colorant-usage rates, such as discussed above at least in the context of FIG. 3.

At block 1230, the prediction server can determine a prediction of colorant usage for the first printing device using the first plurality of functions, such as discussed above at least in the context of FIGS. 3 and 10A-11A.

At block 1240, the prediction server can provide an output involving the prediction of colorant usage for the first printing device, where the prediction of colorant usage includes a confidence interval related to the prediction, such as discussed above at least in the context of FIGS. 3 and 10A-11A.

In some embodiments, where the output of the computing device includes a prediction of a number of days before colorant replacement for the first printing device, such as discussed above at least in the context of FIGS. 10A-11A. In particular of these embodiments, the confidence interval can include a range of days related to the prediction of the number of days before colorant replacement for the first printing device, such as discussed above at least in the context of FIGS. 10A-11A.

In some embodiments, method 1200 can further include: the prediction server receiving information about usage of the first printing device, the information about usage including a first number-of-pages value related to a number of pages printed by the first printing device during a first time interval and a first colorant-level value related to an amount of colorant available to the first printing device at a particular time within the first time interval, such as discussed above at least in the context of FIG. 3. In particular embodiments, the one or more colorant-usage rates can include a first colorant-usage rate; then, determining the first plurality of functions can include: determining a first colorant-usage rate for the first time interval based on the first colorant-level value; determining whether the first colorant-usage rate is within a distribution of colorant-usage rate values; and after determining that the first colorant-usage rate is within the distribution of colorant-usage rate values, determining the at least one linear function based on the first colorant-usage rate, such as discussed above at least in the context of FIG. 3. In more particular embodiments, the distribution of colorant-usage rate values can include a colorant-usage-per-page rate that is based on one or more colorant-level values for the first printing device and one or more number-of-pages values for the first printing device, such as discussed above at least in the context of FIG. 3. In even more particular embodiments, the information about usage of the first printing device can include a plurality of number-of-pages values for the first printing device; then, determining the first plurality of functions can include determining the at least one non-linear function based upon application of a regression technique to the plurality of number-of-pages values, such as discussed above at least in the context of FIG. 3.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for predicting printer device colorant usage, the method comprising:
    receiving, at a prediction server, a request to predict colorant usage for a first printing device;
    determining, at the prediction server, a first plurality of functions to predict colorant usage for the first printing device, wherein the first plurality of functions comprise at least one linear function and a plurality of non-linear functions, wherein the first plurality of functions are based on one or more colorant-usage rates that indicate historical rates of change in colorant used by a plurality of printing devices that include the first printing device, and wherein determining the plurality of non-linear functions includes i) analyzing historical rates of change in colorant used by the plurality of printing devices, and ii) determining a pre-determined number of periodic components of the historical rates of change;
    determining, at the prediction server, a prediction of colorant usage for the first printing device using the first plurality of functions; and
    providing an output of the prediction server involving the prediction of colorant usage for the first printing device, the prediction of colorant usage comprising an estimated time before replacing colorant for the first printing device without replacement and a confidence interval indicating a range of time related to the estimated time before replacing colorant for the first printing device.

2. The method of claim 1, wherein the pre-determined number of periodic components comprises one or more of a weekly periodic component related to weekly usage of the first printing device, a monthly periodic component related to monthly usage of the first printing device, and a yearly periodic component related to yearly usage of the first printing device.

3. The method of claim 2, the pre-determined number of periodic components comprises the weekly periodic component, the monthly periodic component, and the yearly periodic component.

4. The method of claim 1, further comprising:
    receiving, at the prediction server, information about usage of the first printing device, the information about usage comprising a first number-of-pages value related to a number of pages printed by the first printing device during a first time interval and a first colorant-level value related to an amount of colorant available to the first printing device at a particular time within the first time interval.

5. The method of claim 4, wherein the one or more colorant-usage rates comprise a first colorant-usage rate, and wherein determining the first plurality of functions comprises:
    determining the first colorant-usage rate for the first time interval based on the first colorant-level value;
    determining whether the first colorant-usage rate is within a distribution of colorant-usage rate values; and
    after determining that the first colorant-usage rate is within the distribution of colorant-usage rate values, determining the at least one linear function based on the first colorant-usage rate.

6. The method of claim 5, wherein the distribution of colorant-usage rate values comprises a colorant-usage-per-page rate that is based on one or more colorant-level values and one or more number-of-pages values.

7. The method of claim 4, wherein the information about usage of the first printing device comprises a plurality of number-of-pages values for the first printing device, and wherein determining the first plurality of functions comprises determining the plurality of non-linear functions based upon application of a regression technique to the plurality of number-of-pages values.

8. The method of claim 1, wherein the first plurality of functions comprises a function related to maintenance performed on the first printing device.

9. The method of claim 1, wherein the first plurality of functions comprises a function related to colorant capacity of the first printing device.

10. The method of claim 1, wherein the output of the prediction server comprises a prediction of a number of days before colorant replacement for the first printing device.

11. The method of claim 10, wherein the confidence interval comprises a range of days related to the prediction of the number of days before colorant replacement for the first printing device.

12. The method of claim 1, wherein determining the first plurality of functions comprises:
    obtaining current usage data from the first printing device, the current usage data comprising data related to toner usage by the first printing device; and determining historical usage data for the first printing device based on the current usage data, wherein the historical usage data comprises at least one colorant-usage rate of the one or more colorant-usage rates.

13. A prediction server, comprising:
one or more processors; and
data storage configured to store computer-readable instructions that, when executed by the one or more processors, cause the prediction server to perform tasks comprising:
receiving a request to predict colorant usage for a first printing device;
determining a first plurality of functions to predict colorant usage for the first printing device, wherein the first plurality of functions comprise at least one linear function and a plurality of non-linear functions, wherein the first plurality of functions are based on one or more colorant-usage rates that indicate historical rates of change in colorant used by a plurality of printing devices that include the first printing device, and wherein determining the plurality of non-linear functions includes i) analyzing historical rates of change in colorant used by the plurality of printing devices, and ii) determining a pre-determined number of periodic components of the historical rates of change;
determining a prediction of colorant usage for the first printing device using the first plurality of functions; and
providing an output involving the prediction of colorant usage for the first printing device, the prediction of colorant usage comprising an estimated time before replacing colorant for the first printing device without replacement and a confidence interval indicating a range of time related to the estimated time before replacing colorant for the first printing device.

14. The prediction server of claim 13, wherein the pre-determined number of periodic components comprises one or more of a weekly periodic component related to weekly usage of the first printing device, a monthly periodic component related to monthly usage of the first printing device, and a yearly periodic component related to yearly usage of the first printing device.

15. The prediction server of claim 14, the pre-determined number of periodic components comprises the weekly periodic component, the monthly periodic component, and the yearly periodic component.

16. The prediction server of claim 13, wherein the tasks further comprise:
receiving information about usage of the first printing device, the information about usage comprising a first number-of-pages value related to a number of pages printed by the first printing device during a first time interval and a first colorant-level value related to an amount of colorant available to the first printing device at a particular time within the first time interval.

17. The prediction server of claim 16, wherein the one or more colorant-usage rates comprise a first colorant-usage rate, and wherein determining the first plurality of functions comprises:
determining the first colorant-usage rate for the first time interval based on the first colorant-level value;
determining whether the first colorant-usage rate is within a distribution of colorant-usage rate values; and
after determining that the first colorant-usage rate is within the distribution of colorant-usage rate values, determining the at least one linear function based on the first colorant-usage rate.

18. The prediction server of claim 13, wherein the first plurality of functions comprises one or more of: a function related to maintenance performed on the first printing device, and a function related to colorant capacity of the first printing device.

19. The prediction server of claim 13, wherein the output comprises a prediction of a number of days before colorant replacement for the first printing device, and wherein the confidence interval comprises a range of days related to the prediction of the number of days before colorant replacement for the first printing device.

20. An article of manufacture comprising non-transitory data storage storing at least computer-readable instructions that, when executed by one or more processors of a prediction server, cause the prediction server to perform tasks comprising:
receiving, a request to predict colorant usage for a first printing device;
determining a first plurality of functions to predict colorant usage for the first printing device, wherein the first plurality of functions comprise at least one linear function and a plurality of non-linear functions, wherein the first plurality of functions are based on one or more colorant-usage rates that indicate historical rates of change in colorant used by a plurality of printing devices that include the first printing device, and wherein determining the plurality of non-linear functions includes i) analyzing historical rates of change in colorant used by the plurality of printing devices, and ii) determining a pre-determined number of periodic components of the historical rates of change;
determining a prediction of colorant usage for the first printing device using the first plurality of functions; and
providing an output involving the prediction of colorant usage for the first printing device, the prediction of colorant usage comprising an estimated time before replacing colorant for the first printing device without replacement and a confidence interval indicating a range of time related to the estimated time before replacing colorant for the first printing device.

* * * * *